United States Patent
Yu et al.

(10) Patent No.: US 10,503,858 B1
(45) Date of Patent: Dec. 10, 2019

(54) METHOD, SYSTEM, AND COMPUTER PROGRAM PRODUCT FOR IMPLEMENTING GROUP LEGAL PLACEMENT ON ROWS AND GRIDS FOR AN ELECTRONIC DESIGN

(71) Applicant: Cadence Design Systems, Inc., San Jose, CA (US)

(72) Inventors: Henry Yu, Palo Alto, CA (US); Kuoching Lin, Cupertino, CA (US); Hui Xu, Wexford, PA (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 15/396,178

(22) Filed: Dec. 30, 2016

(51) Int. Cl.
*G06F 17/50* (2006.01)

(52) U.S. Cl.
CPC ...... *G06F 17/5072* (2013.01); *G06F 17/5081* (2013.01); *G06F 2217/06* (2013.01)

(58) Field of Classification Search
CPC ....... H04L 41/22; H04L 29/06; H04L 43/045; H04L 43/10; H04L 43/16; H04L 65/403; H04L 69/329; G06F 3/0484; G06F 9/542; G06F 16/9032; G06F 3/04847; G06F 11/3006; G06F 11/3409; G06F 16/903; G06F 3/0481; G06F 3/04817; G06F 3/0482; G06F 3/04842; G06F 9/451; G06F 16/24573; G06F 17/5045; G06F 7/10; G06F 9/541; G06F 9/547; G06F 11/324; G06F 16/2358; G06F 16/2365; G06F 16/2379; G06F 16/245; G06F 16/24556; G06F 16/24565; G06F 16/2462; G06F 16/2477; G06F 16/27; G06F 16/288; G06F 16/951; G06F 19/3418; G06F 3/0321; G06F 3/03545; G06F 8/24; G06F 8/30; G06F 8/33; G06F 9/454; G06F 9/465; G06F 9/54; G06T 2207/30148; G06T 7/0006
USPC .................................................. 716/110-117
See application file for complete search history.

(56) References Cited

U.S. PATENT DOCUMENTS

| | | | |
|---|---|---|---|
| 6,209,123 | B1 | 3/2001 | Maziasz |
| 6,370,673 | B1 | 4/2002 | Hill |
| 6,557,153 | B1 | 4/2003 | Dahl |
| 6,823,501 | B1 | 11/2004 | Dahl |
| 7,266,796 | B1 | 9/2007 | Chu |
| 7,937,682 | B2 | 5/2011 | Arunachalam |
| 8,448,117 | B2 | 5/2013 | Dai |

(Continued)

OTHER PUBLICATIONS

Non-Final Office Action dated Nov. 16, 2017 for U.S. Appl. No. 15/396,156.

(Continued)

*Primary Examiner* — Binh C Tat
(74) *Attorney, Agent, or Firm* — Vista IP Law Group, LLP

(57) ABSTRACT

Disclosed are techniques for implementing group legal placement on rows and grids for an electronic design. These techniques identify a group comprising a plurality of instances. A proxy is identified from the plurality of instances. The group is placed in a row region based in part or in whole upon a plurality of permissible characteristics for the proxy without considering permissible characteristics of one or more remaining instances in the group. A group legality may be performed to determine whether the group is placed in the row region in a group legal manner.

20 Claims, 17 Drawing Sheets

(56) References Cited

U.S. PATENT DOCUMENTS

| | | |
|---|---|---|
| 8,788,998 B2 | 7/2014 | Hatamian |
| 9,465,908 B2 | 10/2016 | Bischoff |
| 9,690,896 B2 | 6/2017 | Seo |
| 9,727,685 B2 | 8/2017 | Yuan |
| 2005/0198605 A1 | 9/2005 | Knol |
| 2007/0245281 A1 | 10/2007 | Riepe |
| 2007/0283306 A1 | 12/2007 | Koefferlein |
| 2009/0199142 A1* | 8/2009 | Arunachalam ..... G06F 17/5072 716/132 |
| 2009/0271753 A1* | 10/2009 | Quandt ............... G06F 17/5068 716/119 |
| 2009/0307640 A1 | 12/2009 | Chapman |
| 2010/0070942 A1* | 3/2010 | Madurawe .......... G06F 17/5068 716/128 |
| 2012/0241986 A1 | 9/2012 | Sherlekar |
| 2013/0042217 A1 | 2/2013 | Heng |
| 2013/0104093 A1* | 4/2013 | Huang ................ G06F 17/5054 716/120 |
| 2014/0289695 A1 | 9/2014 | Yoshida |
| 2014/0331198 A1* | 11/2014 | Bischoff ................. G06F 17/50 716/135 |
| 2015/0067616 A1* | 3/2015 | Hsu ..................... G06F 17/5072 716/52 |
| 2017/0032073 A1 | 2/2017 | Chen |
| 2018/0144082 A1 | 5/2018 | Hanchinal |

OTHER PUBLICATIONS

Non-Final Office Action dated Feb. 8, 2018 for U.S. Appl. No. 15/396,205.
Final Office Action dated May 17, 2018 for U.S. Appl. No. 15/396,156.
Final Office Action dated Aug. 8, 2018 for U.S. Appl. No. 15/396,205.
Non-Final Office Action dated Dec. 31, 2018 for U.S. Appl. No. 15/396,229.
Notice of Allowance dated Mar. 5, 2019 for U.S. Appl. No. 15/396,205.
Non-Final Office Action dated Mar. 12, 2019 for U.S. Appl. No. 15/396,229.
Notice of Allowance dated Apr. 9, 2019 for U.S. Appl. No. 15/396,156.
Notice of Allowance dated Jun. 7, 2019 for U.S. Appl. No. 15/476,921.
Non-Final Office Action dated Oct. 4, 2018 for U.S. Appl. No. 15/396,156.
Notice of Allowance dated Aug. 16, 2019 for U.S. Appl. No. 15/396,229.

* cited by examiner

| Group Id | Instance Id | Permissible Row | Permissible Orientation |
|---|---|---|---|
| 602 | 612 | Row0 | {R0, MX} |
| 602 | 612 | Row1 | {R180, MY} |
| 602 | 614 | Row1 | {R0, R180, MY} |
| 602 | 614 | Row3 | {R0} |
| 602 | 616 | Row0 | {R0, R180, MX, MY} |
| 602 | 616 | Row1 | {R0, MY} |
| 602 | 618 | Row3 | {R180, MY} |
| 602 | 618 | Row4 | {R0, R180, MX} |
| 602 | 620 | Row2 | {R90, MX, MY} |
| 602 | 620 | Row5 | {R270, MX} |
| 602 | 622 | Row1 | {sR0, R180, MY} |
| . | . | . | . |
| . | . | . | . |
| . | . | . | . |

600B

FIG. 6B

METHOD, SYSTEM, AND COMPUTER PROGRAM PRODUCT FOR IMPLEMENTING GROUP LEGAL PLACEMENT ON ROWS AND GRIDS FOR AN ELECTRONIC DESIGN

CROSS REFERENCE TO RELATED APPLICATIONS

This application is related to U.S. patent application Ser. No. 15/396,156, entitled "METHOD, SYSTEM, AND COMPUTER PROGRAM PRODUCT FOR IMPLEMENTING PLACEMENT USING ROW TEMPLATES FOR AN ELECTRONIC DESIGN", U.S. patent application Ser. No. 15/396,229, entitled "METHOD, SYSTEM, AND COMPUTER PROGRAM PRODUCT TO IMPLEMENT SNAPPING FOR AN ELECTRONIC DESIGN", U.S. patent application Ser. No. 15/396,205, entitled "METHOD, SYSTEM, AND COMPUTER PROGRAM PRODUCT FOR IMPLEMENTING LEGAL PLACEMENT WITH CONTEXTUAL AWARENESS FOR AN ELECTRONIC DESIGN". The content of the aforementioned U.S. patent applications are hereby incorporated by reference in their respective entireties for all purposes.

BACKGROUND

Electronic designs often include a group of circuit component or device instances that may be manipulated (e.g., placed) as a group while maintaining the relative positioning of the circuit component or device instances within the group. For example, electronic designs may incorporate an IP (intellectual property) block or cell that may be placed as a group without having to process (e.g., placement, routing, etc.) the devices inside the group. In addition, modern electronic designs with advanced process nodes may allow only specific arrangements of cell or device instances.

Such specific arrangements may also be better suited for manipulation as a group, rather than manipulating the individual instances separately while bearing the risk of violating the specific arrangement requirement or incurring more computational costs. This manipulation of layout instances as a group has become a challenge in modern electronic designs that involve the use of rows in placement of instances. For example, placement rows in a placement layout or floorplan may allow certain types of circuit components and may have different characteristics, attributes, or configurations (e.g., permissible device type(s), permissible orientation(s), alignment requirement(s), offset requirement(s), spacing, etc.) so that when one row accommodates some of the instances in a group, the neighboring row or rows may not accommodate the remaining instances in the same group. In some cases, some advanced nodes may further impose additional alignment requirements that require the fin grids of a multi-gate device design (e.g., a FinFET or Fin Field Effect Transistor) be aligned with that in a layout area (e.g., a row region), and the polysilicon grid of a circuit component design be aligned with that that in a layout area (e.g., a row region).

Conventional approaches often require the tool (e.g., a layout editor, a placement module, etc.) to descend into the group in order to access the individual instances within the group. Such a descent requires opening and checking out the group as well as individual instances from one or more databases in order to place the group in a placement layout and check each instance to determine its legality with respect to each of a plurality of requirements, constraints, and design rules (collectively requirement for singular or requirements for plural). Checking each individual instance against the plurality of requirements, when compounded with the relative placement requirements among the instances within the group, often requires an iterative approach that incrementally moves the group in a layout area hoping to find a viable legal position to place the group while satisfying the plurality of requirements as well as the relative placement requirements. Such conventional approaches fall short due to the excessive computations involved therein.

To further exacerbate the complexities and hence the excessive consumption of computational resources, certain advance technology nodes (e.g., 14 nm technology nodes or below) may further impose additional requirements that include, for example, specific alignment requirements for devices (e.g., a multi-gate device such as a FinFET or Fin Field Effect Transistor) with respect to corresponding grids. For example, one alignment requirement may require the fin grids within a multi-gate device be aligned with the fin grids set forth in the placement layout or a portion thereof (e.g., a region). Another example of such alignment requirements may require the poly grids within device designs be aligned with the poly grid defined in the placement layout or a portion thereof. These additional specific alignment requirements further exacerbate the complexities of finding legal placement solutions for groups.

Certain advanced technology nodes may further require width rules that permit an interconnect of a certain width be located to other interconnects with a limited number of widths. For example, a width rule may require a 58 nm-wide interconnect be located only to interconnects having width values of 40 nm, 46 nm, 62 nm, and 70 nm and prohibits the 58 nm-wide interconnect from being immediately adjacent to interconnects having width values of 32 nm or smaller. These additional track pattern rules further also exacerbate the complexities of finding legal placement solutions for groups.

Therefore, there is a need for implementing group legal placement for an electronic design to address at least the foregoing issues with conventional approaches.

SUMMARY

Disclosed are method(s), system(s), and article(s) of manufacture for implementing group legal placement on rows and grids for an electronic design in various embodiments. Some embodiments are directed to a method for implementing group legal placement on rows and grids for an electronic design. In these embodiments, a group comprising a plurality of instances may be identified. A reference instance (or a proxy instance) may further be identified from the plurality of instances. It shall be noted that the terms "reference instance" and "proxy instance" or simply "proxy" may be used interchangeably in the present disclosure. The group may be placed in a row region based in part or in whole upon a plurality of permissible characteristics for the reference instance without considering permissible characteristics of one or more remaining instances in the group. A group legality may be performed to determine whether the group is placed in the row region in a group legal manner.

In some embodiments, non-compliance resolution may be performed on one or more non-compliant instances in the plurality of instances in the group. In some of these embodiments, a determination may be made to decide whether the group is a hard group or a soft group, wherein the hard group is not amenable to modifications within the hard group, and the soft group is amenable to the modifications within the soft group. The group may be modified when the group is determined to be a soft group; and the group may be flagged for further review when the group is determined to be a hard group. In addition or in the alternative, the row region may be modified based in part or in whole upon the one or more non-compliant instances in the plurality of instances for the non-compliance resolution; or one or more row region characteristics of the row region or one or more permissible characteristics pertaining to non-compliance of the non-compliant instances may be relaxed for the non-compliance resolution.

In some embodiments, the search space for identifying legal placement options may be reduced by applying one or more pre-filtering techniques. In some of these embodiments, a rectilinear bounding box encompassing the group may be determined; an extent of the row region may be identified; and a determination may be made to decide whether the extent of the row region accommodate the rectilinear bounding box of the group based in part or in whole upon the plurality of permissible characteristics of the reference instance.

In addition or in the alternative, one or more group rows in the group and respective permissible characteristics for the one or more group rows may be identified; one or more row region rows created in the row region and corresponding row characteristics for the one or more row region rows obtained by applying at least one row template to the row region may also be identified; and the group legality of the group may be determined at least by comparing the respective permissible characteristics to the corresponding row characteristics.

To determine whether the layout is group legal, a first remaining instance of one or more remaining instances other than the reference instance in the group may be identified from the row region; a first plurality of permissible characteristics may also be identified for the first remaining instance; and a group legality check at least by determining whether placement of the first remaining instance in the row region satisfies the first plurality of permissible characteristics. In some of these embodiments, a determination may be made to decide whether there exist one or more other remaining instances whose legality in the row region has not been determined when the first remaining instance is determined to be legal. The one or more other remaining instances may be identified when it is determining that there exist the one or more remaining whose legality in the row region has not been determined; and the group legality check may be performed for the one or more other remaining instances.

When the group is determined to be placed in a group legal manner, a first legal placement option may be generated for placing the group in the row region when the one or more remaining instances satisfy their respective pluralities of permissible characteristics. In some of these embodiments, a determination may be made to decide whether the group legality check is to be terminated when the first remaining instance is determined to be legal; one or more different combinations of the plurality of permissible characteristics may be identified for the proxy when the group legality check is determined not to be terminated; and the group may be placed into the row region according to a different combination of the one or more different combinations for the proxy, without considering permissible characteristics of the one or more remaining instances other than the proxy in the group.

In some embodiments, a determination may be made to decide whether the layout is group legal at least by performing the group legality check on the one or more remaining instances. Zero or more legal placement options for placing the group in the row region may be determined; a final legal placement option for placing the group in the row region may be identified from the first legal placement option and the zero or more legal placement options; and the first legal placement option and the zero or more legal placement options may be stored in a data structure.

Some embodiments are directed at a hardware system that may be invoked to perform any of the methods, processes, or sub-processes disclosed herein. The hardware system may include at least one processor or at least one processor core, which executes one or more threads of execution to perform any of the methods, processes, or sub-processes disclosed herein in some embodiments. The hardware system may further include one or more forms of non-transitory machine-readable storage media or devices to temporarily or persistently store various types of data or information. Some exemplary modules or components of the hardware system may be found in the System Architecture Overview section below.

Some embodiments are directed at an article of manufacture that includes a non-transitory machine-accessible storage medium having stored thereupon a sequence of instructions which, when executed by at least one processor or at least one processor core, causes the at least one processor or the at least one processor core to perform any of the methods, processes, or sub-processes disclosed herein. Some exemplary forms of the non-transitory machine-readable storage media may also be found in the System Architecture Overview section below.

More details of various aspects of the methods, systems, or articles of manufacture for implementing group legal placement on rows and grids for an electronic design are described below with reference to FIGS. 1-7B.

BRIEF DESCRIPTION OF THE DRAWINGS

The drawings illustrate the design and utility of various embodiments of the invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which:

FIGS. 6A-6H illustrate some examples of the application of some techniques described herein to a simplified example of a placement layout or floorplan in some embodiments.

DETAILED DESCRIPTION

Various embodiments are directed to a method, system, and computer program product for implementing placement using row templates for an electronic design using row templates. Other objects, features, and advantages of the invention are described in the detailed description, figures, and claims.

To address the shortcomings of conventional approaches, various embodiments identify a group that includes a plurality of instances or circuit component designs (collectively instances for plural or instance for singular). A proxy together with a plurality of permissible or legal characteristics may be identified from the plurality of instances. It shall be noted that the term permissible and legal may be used interchangeably throughout the present disclosure. A combination of at least some of the plurality of permissible characteristics may be identified, and the proxy may be placed in a row region based at least in part on the combination of at least some of the plurality of permissible characteristics.

The remaining instances in the group are inserted into the row region based in part or in whole upon their relative positioning to the proxy, without regard to their respective permissible characteristics governing placement of these remaining instances. A group legality check may then be performed on the remaining instances to determine whether the group is placed in the row region in a group legal manner that satisfies all the permissible characteristics for the proxy and the remaining instances.

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

Figure 1:
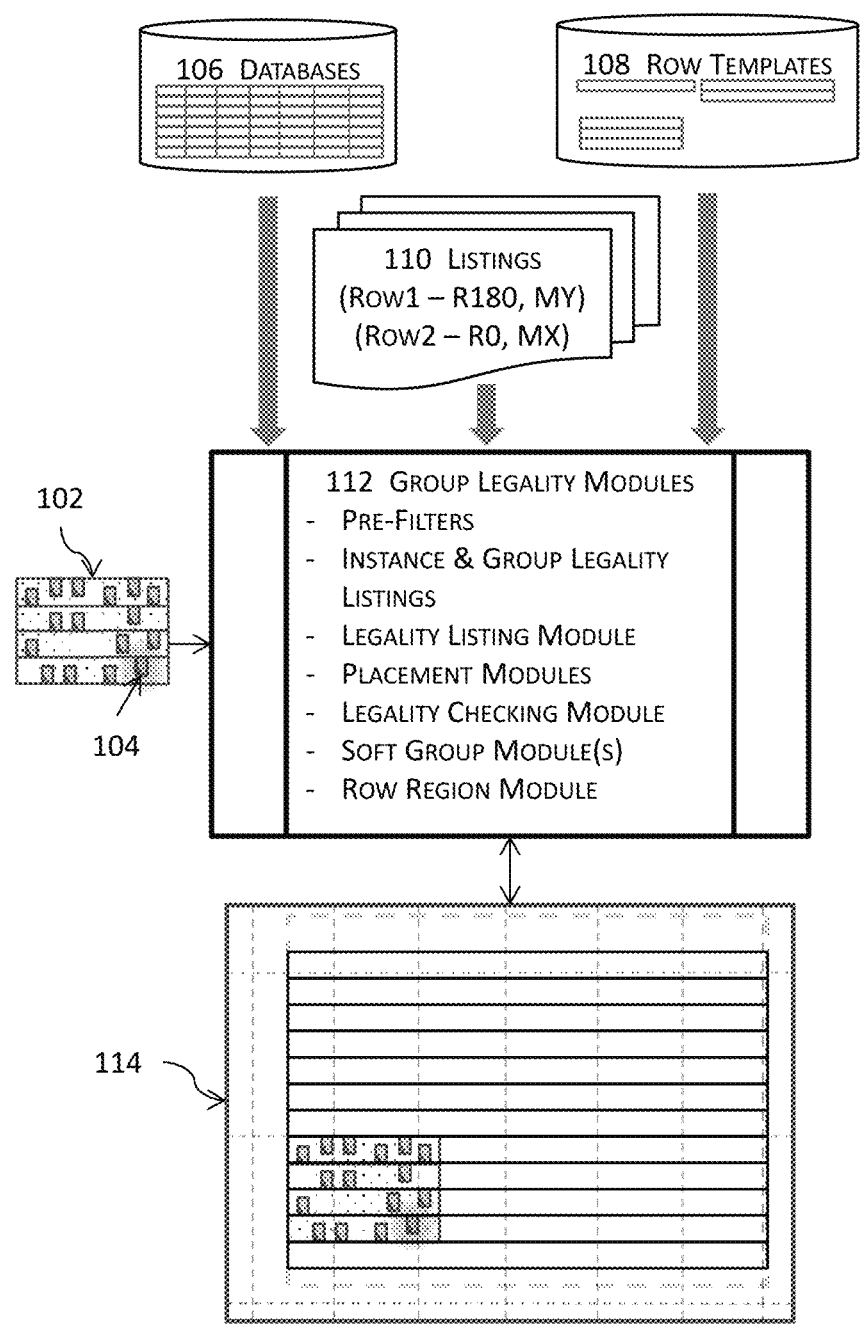
FIG. 1 illustrates a high level block diagram for implementing group legal placement on rows and grids for an electronic design in one or more embodiments.

FIG. 1 illustrates a high level block diagram for implementing group legal placement on rows and grids for an electronic design so that the group as well as the plurality of instances in the group are row-compliant and grid compliant in one or more embodiments. In these embodiments, a plurality of group legality modules 112 such as those described with reference to FIG. 7A may be configured to place a group 102 having a plurality of instances into a placement layout or floorplan 114. This group 102 may be a pre-existing block of instances (e.g., an intellectual property or IP cell) or a collection of instances located in a placement layout or a floorplan and selected by a designer via the user interface. A group may be hard in some embodiments where design details (e.g., the relative placement information, connectivity, etc.) within a hard group cannot be mutilated. A group may be soft in some other embodiments where design details (e.g., the relative placement information, connectivity, etc.) within a soft group may be modified.

The plurality of group legality modules may be operatively coupled with a database 106 storing thereupon a layout or a floorplan for an electronic design of interest, a row template repository 108 storing a plurality of row templates, and a plurality of listings 110. A listing 110 may include the information of permissible characteristics for an instance in the group. These permissible characteristics for an instance include, for example, one or more permissible rows in which the instance may be inserted, one or more permissible orientations in which the instance may be oriented in a specific row, permissible alignment options for the instance with respective one or more grids (e.g., Fin grid, polysilicon grid, etc.), permissible offset values for the instance, or any other suitable requirements, or any combinations thereof. More details about permissible characteristics are described in the U.S. patent applications listed in the section entitled Cross Reference to Related Applications.

A similar listing 110 may also be created for the group. These listings 110 may be computed on the fly in a nearly real-time fashion in some embodiments or may be pre-computed and stored for reference by the plurality of group legality modules 112. Upon receiving a request to create a placement layout, a floorplan, or a portion thereof of an electronic design of interest from, for example, the user interface, these group legality modules 112 may function in conjunction with one or more EDA (electronic design automation) modules to determine a legal location for the group in the placement layout or floorplan 114.

More specifically, the plurality of group legality modules 112 may identify a proxy 104 from the plurality of instances in the group as well as one or more permissible characteristics for the proxy. The plurality of group legality modules 112 may then identify a legal location at which the proxy is placed. The remaining instances in the group will be placed into the placement layout or floorplan by using the relative placement information without examining any placement conditions or requirements, regardless of whether the group of interest is hard or soft. Because the proxy is inserted by referencing its permissible legal characteristics, the proxy is thus considered placed at a legal location. The plurality of group legality modules 112 may then check the legality of the group by checking one or more remaining instances in the group against their respective requirements. In some embodiments, one or more pre-filter checks may be performed on the group to quickly determine whether the group is placed at a legal location, without examining any of the remaining instances in the group.

If the proxy is placed at a legal location so that all the remaining instances in the group are placed legally in the placement layout or floorplan, the group is determined to be legally placed. On the other hand, if the plurality of group legality modules 112 determines that no legal solutions may be found for one or more remaining instances in the group, the location at which the proxy and thus the group is placed does not yield legal solutions. The proxy may then be moved to another legal location or orientation, and the plurality of group legality modules 112 repeat the aforementioned checks.

If no legal solutions may be found for the group after the permissible characteristics of the proxy have been exhausted, the group may be optionally modified in some embodiments that allow modifications to the group. In some other embodiments, one or more requirements may be optionally relaxed so that at least one potential or candidate legal solution may be found if the relaxed requirement could be made legal with some design modification. In some other embodiments, a region may be carved out of the placement layout, the floorplan, or a row region thereof, and this region may be customized with reduced or minimum deviations from the original placement layout, the floorplan, or the row region thereof to custom fit the group.

Figure 2:
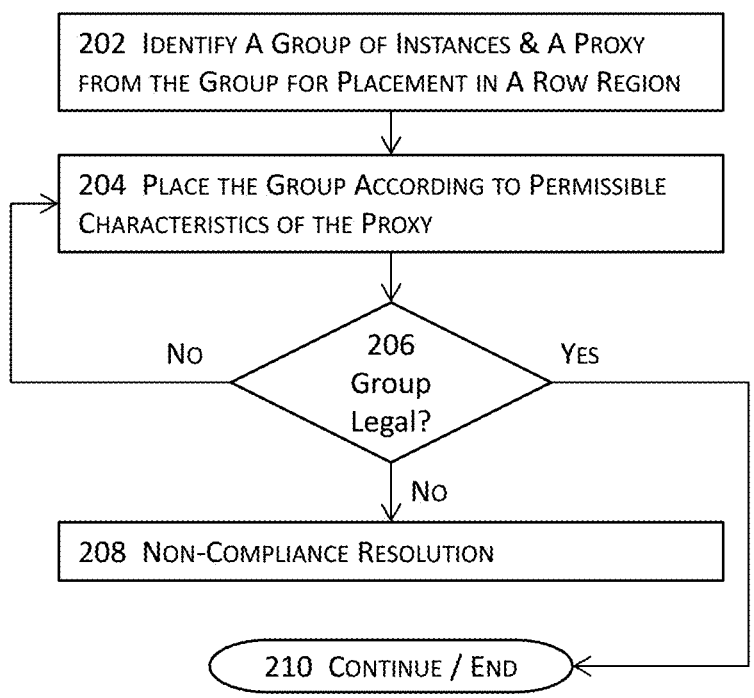
FIG. 2 illustrates a high level flow diagram for implementing group legal placement on rows and grids for an electronic design in one or more embodiments.

FIG. 2 illustrates a high level flow diagram for implementing group legal placement on rows and grids for an electronic design in one or more embodiments. In these embodiments, a group of instances may be identified at 202. The group identified at 202 may include a pre-existing cell of instances (e.g., an IP cell) in some embodiments. In some other embodiments, the group may be a collection of instances located in a placement layout or a floorplan and selected by a designer via the user interface. For example, a designer may use a pointing device to select a collection of instances in a layout and form a group at 202.

As described briefly above, a group may be hard in some embodiments where design details (e.g., the relative placement information, connectivity, etc.) within a hard group cannot be mutilated. For example, a group described herein may refer to an IP block belonged to a third-party and used in an electronic design by a designer who is not exposed to the contents of the IP block or licensed to alter such contents. In this example, the hard IP block is merely used in the electronic design by the designer, and the details of the IP block (e.g., relative placement of instances within the block, connectivity, etc.) cannot be altered. A group may be soft in some other embodiments where design details (e.g., the relative placement information, connectivity, etc.) within a soft group may be modified. In the aforementioned example where a designer creates a group by using a pointing device to select a collection of instances from a layout, the group or at least a portion thereof may be modified. For example, a designer may instruct a placement module to change the locations of one or more instances in the group.

A reference instance (or a proxy instance or simply a proxy) may be identified from the plurality of instances at 202. A proxy is an instance in the group and may be identified at 202 in any manner. As described above, the terms "reference instance" and "proxy instance" or simply "proxy" may be used interchangeably in the present disclosure unless otherwise explicitly distinguished. In some embodiments, an instance having the fewest number of permissible characteristics may be identified at 202 as the proxy. The identified proxy will be referenced to represent the entire group and used to place the entire group in a placement layout, a floor plan, or a portion thereof (e.g., a row region in the placement layout or in the floor plan).

At 204, the group may be placed in a placement layout, a floor plan, or a portion thereof according to one or more permissible characteristics of the proxy. These one or more permissible characteristics may include, for example, one or more permissible rows into which the proxy may be inserted, one or more permissible orientations in which the proxy may be oriented in a specific row, one or more alignment requirements (e.g., the Fin grid set up within the group be aligned with the Fin grid established for the row region in the placement layout or floorplan), one or more offset requirements, or any other suitable requirements controlling the legality of the placement of proxy. In these embodiments, the entire group is placed by placing the reference instance according to the one or more permissible characteristics for the reference instance, positioning the reference instance in its row such that the group may fit within the region in which the row resides, and the remaining instances in the group are placed at their relative positions with respect to the proxy, without considering any requirements or legality of the remaining instances in the group other than the initial fitting of the group within the row region.

A group legality check may be performed at 206 to determine whether the group placed at 204 into the placement layout or floorplan is legal and hence satisfies all the requirements. Because the group of instances is placed at 204 by referencing only the proxy, whether the group is placed in a group legal manner at 206 may be determined at least by examining the legality of the remaining instances (other than the proxy) in the group.

In some embodiments, the group legality check at 206 for the group placed at 204 may be terminated so long as it is determined that one remaining instance in the group results in a violation of a requirement. In some other embodiments, the group legality check at 206 may continue after the identification of one or more instances whose placement according to the proxy at 204 results in one or more corresponding violations. An instances (other than the proxy) whose placement results in one or more violations of requirements may be referred to as a non-compliant instance. On the other hand, an instances (other than the proxy) whose placement complies with all the requirements may be referred to as a compliant instance.

At 208, one or more group legality modules may perform non-compliance resolution when it is determined that no legal solutions exist for the group identified at 202 in the placement layout or floorplan. The non-compliance resolution may include, for example, modifying the group and/or modifying the row region according to the one or more non-compliant instances. More details about non-compliance resolution are described subsequently with reference to FIGS. 3-4. In some embodiments where the group legality check result at 206 indicates that the group is placed in a group legal manner, the process may continue at 210 to return to 202 to identify another group of instances and repeat 202 through 206 to 208 or 210 until all the groups have been similarly processed. If all the groups have been processed, the process in FIG. 2 may terminate at 210.

Figure 3:
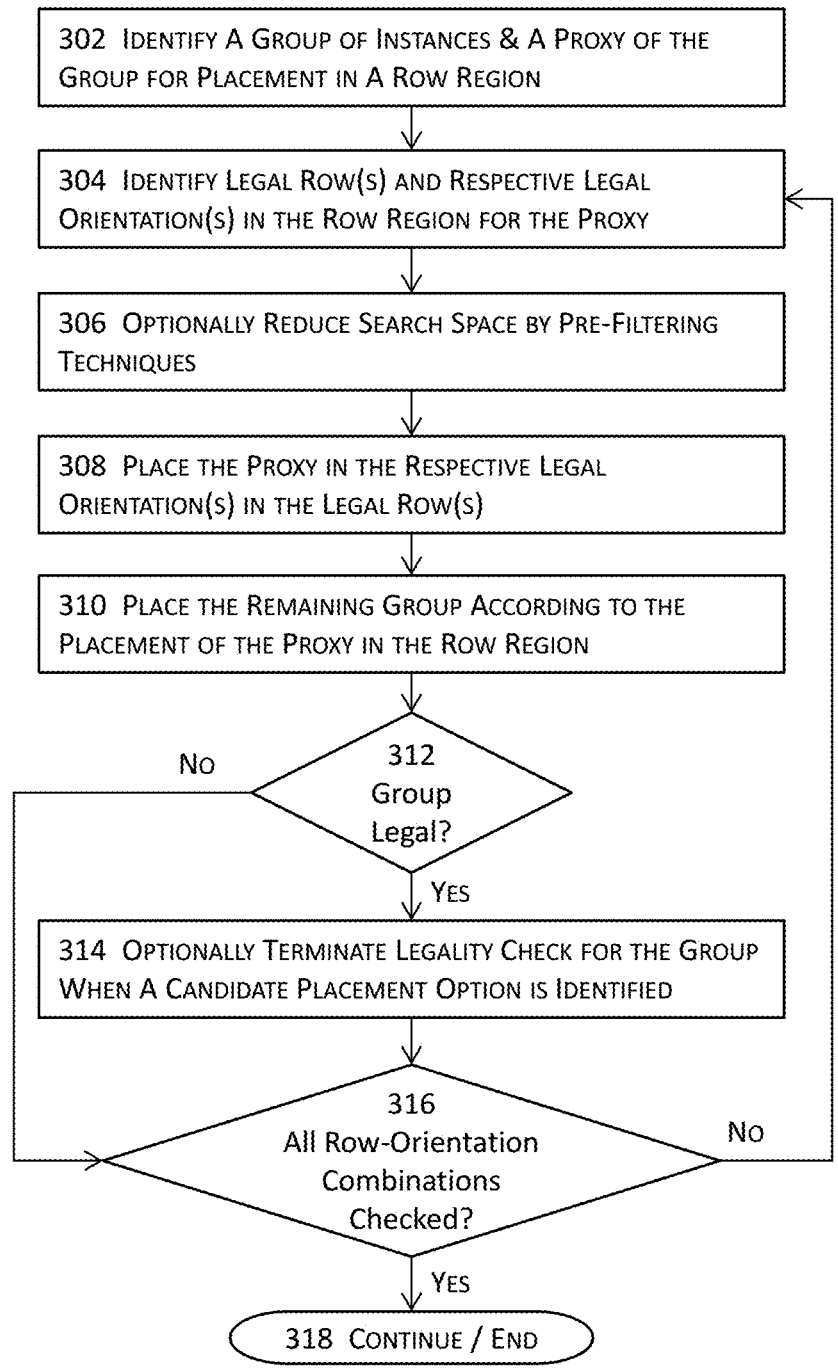
FIGS. 3-4 jointly illustrate a more detailed block diagram for implementing group legal placement on rows and grids for an electronic design in some embodiments.
Figure 4:
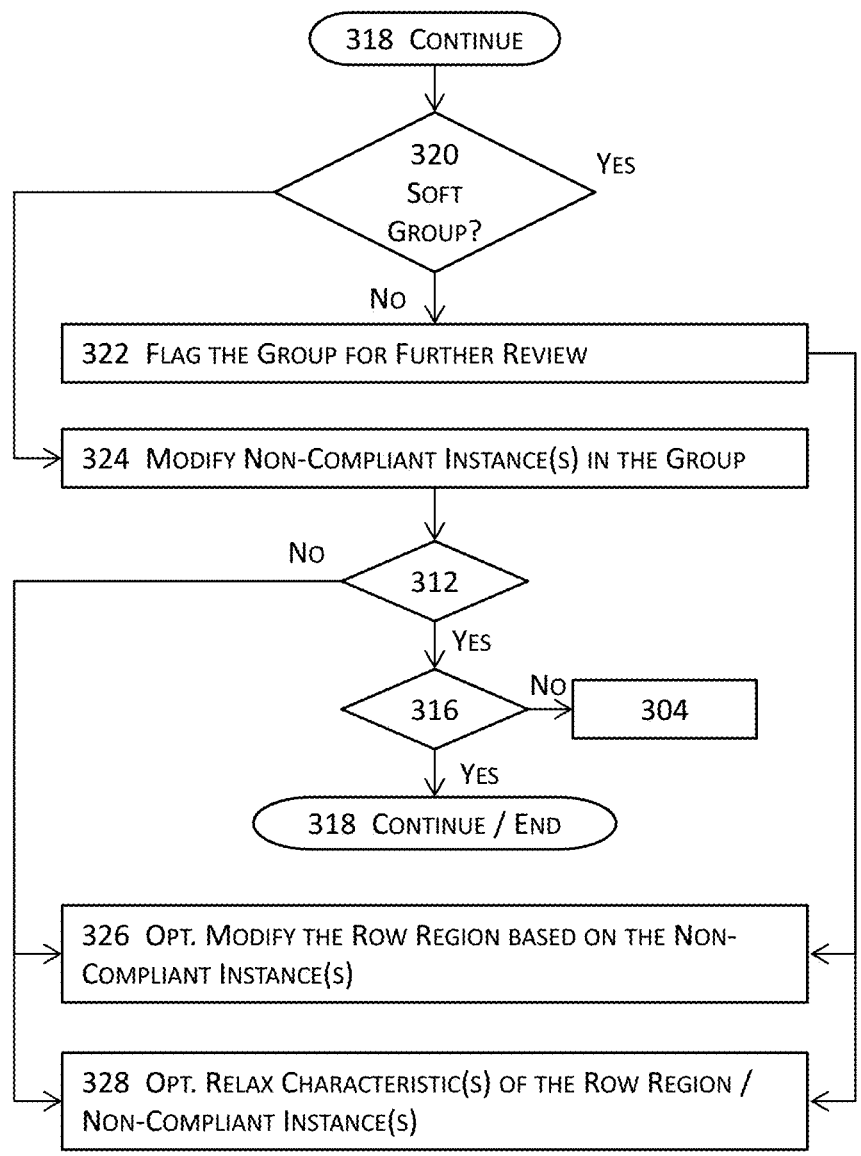

FIGS. 3-4 jointly illustrate a more detailed block diagram for implementing group legal placement on rows and grids for an electronic design in some embodiments.

At 302, a group of instances and a proxy for the group may be identified for placement in a row region. In some embodiments, the row region is configured by applying one or more row templates to create one or more placement rows into which circuit component designs may be placed. Each row may be associated with or may store therein a plurality of characteristics governing how circuit component designs may be inserted into this row. More details about row regions and row templates are described in the U.S. patent applications listed in the section entitled Cross Reference to Related Applications.

One or more permissible or legal characteristics may be identified at 304 for the proxy. These one or more permissible or legal characteristics may include, for example, one or more permissible or legal rows into which the proxy may be inserted and one or more permissible or legal orientations into which the proxy may be oriented in a permissible or legal row in some embodiments. For example, a first row in the row region may allow only NMOS (N-type metal-oxide semiconductor) devices oriented in R0 (rotation by zero degrees) or MX (mirroring against the X-axis) orientation. Other possible orientations may include, for example, R90 (rotation by 90 degrees), R180 (rotation by 180 degrees), R270 (rotation by 270 degrees), MY (mirroring against the Y-axis), MXY (rotation against the X-axis and Y-axis), etc.

In some other embodiments, these one or more permissible or legal characteristics may include permissible alignment options for the instance with respective one or more grids, permissible offset values for the instance, or any other suitable requirements, or any combinations thereof. For the ease of illustration and explanations, the following embodiments are described with respect to permissible or legal rows and orientations although it shall be noted that one or more other permissible or legal characteristics may also be considered. Because the group identified at 302 will be placed into the row region by referencing the proxy and its one or more permissible or legal characteristics, the search space for legally placing the proxy and hence the group may be trimmed by optionally applying one or more pre-filtering techniques.

For example, a bounding box check may be performed to determine whether the row region is sufficiently large to accommodate the rectangular or rectilinear bounding box of the group. It shall be noted that rectilinear bounding boxes are a superset of rectangular bounding boxes, and that bounding boxes described herein are thus referred to as rectilinear bounding boxes. If the row region is not sufficiently large to accommodate the bounding box of the group, the specific combination of a specific row and a permissible orientation may be discarded from the search space to reduce computational resource consumption. For example, if the proxy may be legally placed in Row 0 at the R180 orientation, but the row region is not sufficiently large to accommodate the bounding box of the group when rotated by 180 degrees to comply with the R180 orientation characteristic, the combination of (Row 0, R180) may be discarded from the search space so that the group legality modules no longer need to place the proxy in Row 0 at the R180 orientation and check the legality of the remaining instances in the group.

Another pre-filtering technique that may be optionally applied at 306 to reduce computational resource consumption is checking the rows in the group against those in one or more row templates that have been applied to the row region. Alternatively, the rows in the row region may be checked against those in one or more row templates that have been applied to the group. If the characteristics (e.g., permissible component types, permissible orientations, alignment options, offset options, etc.) of these rows being examined do not match, the group legality modules no longer need to attempt to place the proxy in the portions and check the group legality for the group.

The proxy may then be placed in a legal or permissible row at a legal or permissible orientation at 308. These techniques may assume that the group has fixed connectivity and relative placement information among the plurality of instances within the group and place the remaining instances in the group at 310 into the row region according to the relative placement information, without considering any placement requirements associated with these remaining instances.

The group legality modules may then determine whether the group is placed in a group legal manner in the row region at 312. A group is considered to be placed in a group legal fashion when all the remaining instances satisfy their respective permissible or legal characteristics. It shall be noted that the group is placed into the row region at 310 only based on placing the proxy at 308 to satisfy its one or more permissible or legal characteristics, without considering the corresponding the permissible or legal characteristics of any of the remaining instances in the group. Therefore, at least one of these remaining instances needs to be checked to determine whether the group is placed in a group legal manner in the row region.

If the check result at 312 is affirmative (the group is placed in a group legal fashion), a candidate placement option is identified, and an optional determination may be made at 314 to determine whether the group legality check is to be terminated. In some embodiments, the group legality check may be terminated at 314 so that the candidate placement option is the only placement option for the group. Otherwise, the process may continue to 316 to determine whether all row-orientation combinations for the proxy have been checked.

If there is at least one permissible row—permissible orientation combination for the proxy that has not been checked, the process may return to 304 to identify the at least one permissible row—permissible orientation combination and repeat the aforementioned actions until all permissible row—permissible orientation combinations have been checked. The process may then proceed to 318 where the process may continue to either end the process and flag the group for further review or continue with non-compliance resolution. In some embodiments where the group is determined not to be placed in a group legal manner, and all permissible row—permissible orientation combinations have been examined, the process may similarly proceed to 318 to either terminate the process and flag the group for further review or optionally continue with non-compliance resolution.

Non-compliance includes the scenarios where an instance is placed at a location (e.g., at a specification in a row of a row region) that fails to satisfy at least one permissible characteristic for the instance. For example, an instance is determined not to be row-compliant when at least one permissible characteristic for the instance does not match the corresponding information of a row in which the instance is placed. For example, an instance may correspond to permissible characteristics of Row0 and Row3. When the instance is placed in Row0 or Row3, the instance is deemed compliant or row compliant. Otherwise, the instance is not deemed row compliant. It shall be noted that depending on how a permissible characteristic is enforced, non-compliance may or may not necessarily be considered as a violation. In the aforementioned example, if the permissible characteristics of Row0 and Row3 determines the legality of the instance, non-compliance with such permissible characteristics has the same effects as a design rule violation. On the other hand, if it is desired but not required to satisfy the aforementioned permissible characteristics, non-compliance of the permissible characteristics does not rise to the level of design rule violation.

At 320, a determination may be made to decide whether the group is a soft group. If the determination result is negative because the group is a hard group and is thus not subject to modification, the group may be flagged for further review at 322. In some embodiments where the group is determined to be a hard group, the row region may be optionally modified at 326 based in part or in part on one or more non-compliant instances that cause the group to fail the group legality check. In some of these embodiments, a portion of the row region may be carved out and configured with respect to the hard group so that the hard group may be inserted into this carved out portion in a group legal manner. In addition or in the alternative, one or more characteristics of the row region or of the one or more non-compliant instances may be optionally relaxed at 328 so that the hard group determined at 320 may be legally inserted into the row region in a group legal manner. These one or more characteristics are considered relaxable when the non-compliance of which does not cause violations for design rules concerning performance, reliability, and/or manufacturability of the underlying integrated circuit designs.

If the group is determined to be a soft group at 320, the group or one or more non-compliant instances causing the non-compliance during the group legality check may be modified at 324. For example, a non-compliant instance may be moved to a different portion within the soft group according to the group legality check results so that the group may pass the group legality check at least as far as the non-compliant instance is concerned.

The process may return back to 312 to check the group legality of the group after the modification at 324. If the modified group is determined to be placed in a group legal manner at 312, the process may proceed to 316 to optionally determine whether all permissible row—permissible orientation combinations have been examined in an identical or substantially similar manner as that described with reference to 314-316 above. If the determination result is affirmative, the process may proceed to 318; otherwise, the process may return to 304 to identify another permissible row—permissible orientation combination and repeat the process as described above.

If the modified group nevertheless fails to pass the group legality check, the row region may be optionally modified at 326 based in part or in part on the non-compliant instances that cause the group to fail the group legality check, other than flagging the group or the modified group for further review. For example, a smaller portion of the region may be carved out of the row region identified at 302, and this smaller portion of the row region may be configured in light of the group or the modified group so that the group or the modified group may be placed in a group legal manner. It shall be noted that configuring the smaller portion of the row region may be performed while exerting a reduced or minimal level of disturbance to the original characteristics of the row region from which the smaller portion is carved out in some embodiments. The purpose of exerting a reduced or minimal level of disturbance is to maintain the integrity of the original design while reducing the risk of having incompatible characteristics between the original row region and the smaller portion.

Alternatively, one or more permissible or legal characteristics for the row region or for a non-compliant instance may be optionally relaxed at 328 so that the non-compliant instance will no longer cause a violation when placed in the row region according to the placement of the proxy based on its one or more permissible or legal characteristics.

Figure 5A:
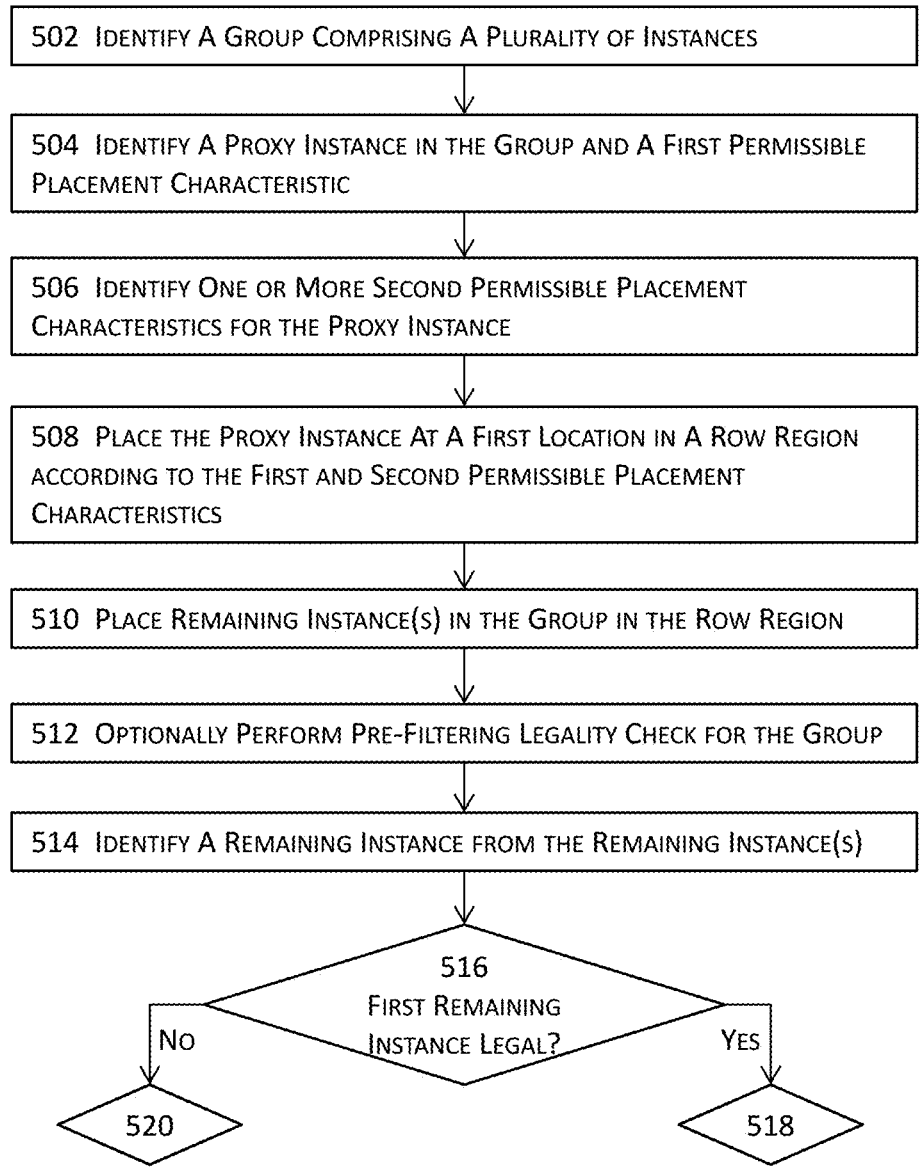
FIGS. 5A-5C jointly illustrate a more detailed block diagram for a block illustrated in FIG. 2 in some embodiments.
Figure 5B:
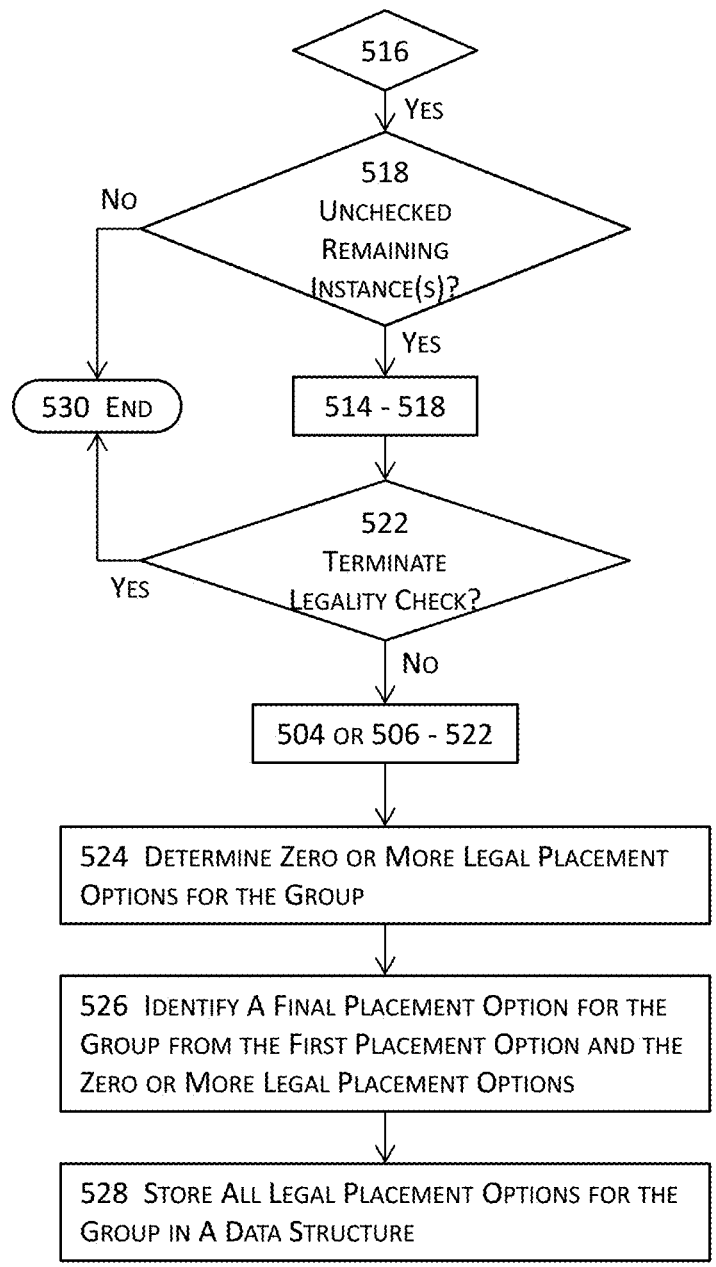
Figure 5C:
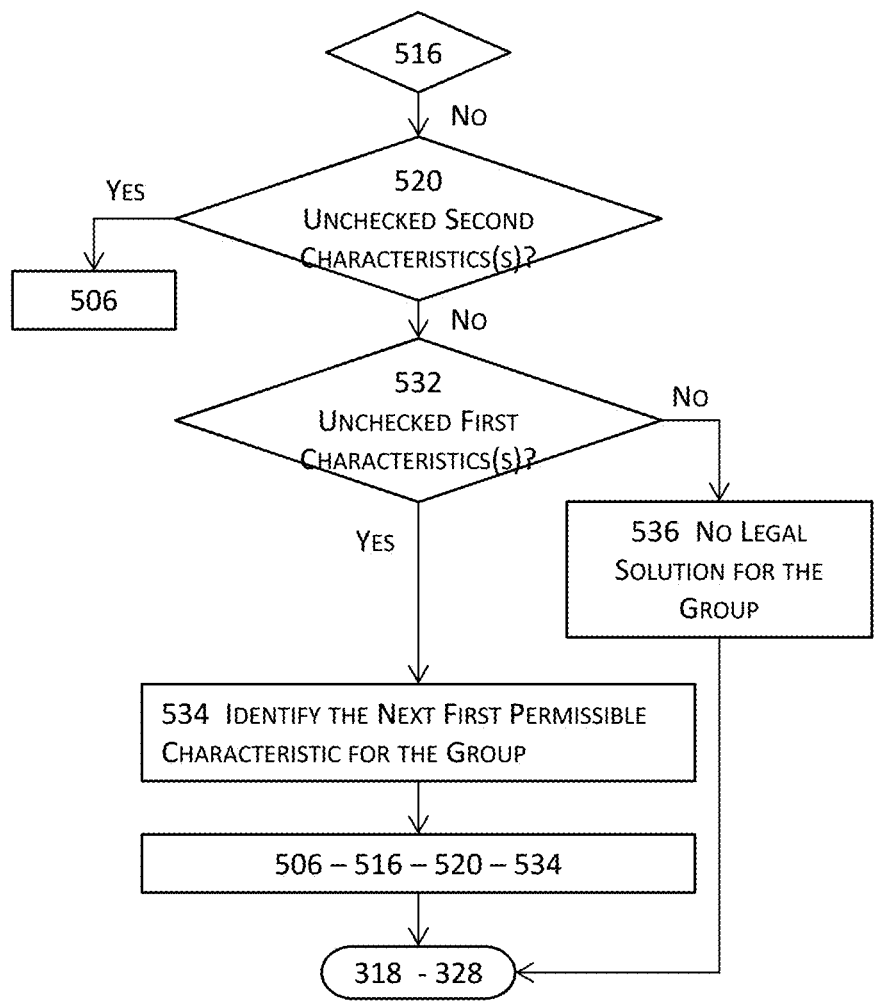

FIGS. 5A-5C jointly illustrate a more detailed block diagram for a block illustrated in FIG. 2 in some embodiments. More specifically, FIGS. 5A-5C jointly illustrate more details about the group legality check at 206 and 312 respectively illustrated in FIGS. 2 and 3. A group comprising a plurality of instances may be identified at 502. A proxy or a proxy instance may be identified from the plurality of instances in the group at 504. In addition, a first permissible placement characteristic may also be identified at 504 for the proxy. For example, a permissible row into which the proxy may be placed may be identified at 504.

One or more second permissible characteristics for the proxy may be identified at 506. For example, one or more permissible orientations in which the proxy may be oriented in the permissible row identified at 504 may be identified at 506. An instance may be oriented in the R0, R90, R180, R270, MX, MY, or MXY orientations although a specific row may allow only one or more of the above orientations. For example, the permissible Row 0 may allow only the R0 and MX orientations for the proxy, and the permissible Row 4 may allow only the R0, R180, and MY orientations.

The proxy may be placed at a first location in a row region at 510 according to the first and the second permissible placement characteristics. For example, the proxy may be associated with the permissible row 0 in the permissible orientations of R0 and MY. In this example, the proxy may be inserted to the first location in the permissible row 0 with an orientation of R0 (or MY) at 508. With the proxy placed at the first location in the row region, these techniques may temporarily treat the group as a hard group that has fixed relative placement and connectivity information. The one or more remaining instances other than the proxy instance in the group may then be placed at 510 according to their relative locations to the proxy. In these embodiments, these one or more remaining instances may be placed without regard to any requirements, rules, or constraints governing the placement of these one or more remaining instances. As a result, the group legality of the group needs to be further ascertained as described below.

Pre-filter legality check may be optionally performed at 512 in an identical or substantially similar manner as that described above with reference to 306. To perform group legality check, a first remaining instance may be identified from the one or more remaining instances other than the proxy at 514. In some embodiments, the first instance may be identified randomly from the one or more remaining instances in the group. In some other embodiments, the remaining instance corresponding to the fewest number of first permissible placement characteristics, the fewest number of second permissible placement characteristics, or the fewest number of the combinations of the first permissible placement characteristics and the second permissible placement characteristics.

For example, a first remaining instance may correspond to two permissible rows each corresponding to two permissible orientations, and the second remaining instance may correspond to one permissible row corresponding to two permissible orientations. In this example, the second remaining instance provides fewer placement options and is thus less likely to be legally placed. As a result, the second remaining instance may be identified as the first remaining instance. By identifying the first remaining instance in this manner, unnecessary computational resource consumption in legally placing a remaining instance with a higher likelihood of legality but to find another remaining instance having a lower likelihood of legality may be avoided.

A determination may be made at 516 to determine whether the first remaining instance satisfies its respective permissible placement characteristics. For example, the first remaining instance may be examined to determine whether the first remaining instance is placed in a permissible orientation into a permissible row with the proper alignment and offset(s). If the determination result at 516 is affirmative, the process may proceed to 518. Otherwise, the process may proceed to 520.

In some embodiments where the first remaining instance is determined to have been placed at a legal location at 516, a determination may be made to determine whether there exists at least one remaining instance that has not been checked at 518. If it is determined that all remaining instances other than the proxy have been checked at 518, the process may end at 530. On the other hand, if there exist one or more remaining instances that have not been checked for group legality, the process may return to 514 to identify another remaining instance and repeat the actions from 514 to 518 until the legality of all remaining instances has been checked.

When it is determined that the group is legally placed at a legal location with the combination of the first and second permissible placement characteristics for the proxy, a first legal placement solution is identified for the entire group. Another determination may be made at 522 to decide whether to terminate the group legality check. In some embodiments where the determination result at 522 is affirmative, the process may also end at 530. In these embodiments, the first legal placement solution obtained from placing the proxy with the combination of the first and second permissible placement characteristics becomes the only legal placement solution due to the termination of the group legality check.

In some other embodiments where it is determined to continue to search for other legal placement options, the process may return to 504 to identify another first permissible characteristic (e.g., another permissible row into which the proxy may be placed) or to 506 to identify another second permissible characteristic (e.g., another permissible orientation in which the proxy may be oriented in a specific row) and repeat the actions from 504 (or 506) to 522. Depending on whether another legal placement option may be identified, zero or more other legal placement options may be determined at 524. For example, if the other combinations of one or more first and second permissible characteristics do not result in any legal placement options for the group, no other legal placement options are identified at 524. Otherwise, all the other legal placement options from these other combinations may be determined at 524 by following an identical or a substantially similar manner as that described for the first legal placement option.

At 526, a final placement option may be identified from the first legal placement option identified at 516 and the zero or more other legal placement options determined at 524. These legal placement options may be stored temporarily or persistently in a data structure at 528 so that if the placement layout or floorplan is to be modified subsequently, the legal placement options can be quickly looked up for the group, without having to perform placement again.

In some embodiments where the first remaining instance is determined not to produce a legal placement layout or floorplan at 516, the process proceed to 520 to determine whether there exists at least one second permissible characteristic that has not been accommodated in the group legality check. If there exists at least one second permissible characteristic that has not been considered in the group legality check, the process may return to 506 to identity the next second permissible characteristic and repeat the actions from 506 through 520 for the next second permissible characteristic in an identical or substantially similar manner as described above.

On the other hand, if all second permissible characteristics have been considered for the first permissible characteristic identified at 504 for the proxy, another determination may be made at 532 to decide whether there exists another first permissible characteristic for the proxy that has not been accommodated in the group legality check. If it is determined that the proxy corresponds to at least one first permissible characteristic that has not been considered in the group legality check, the process may identify the next first permissible characteristic for the proxy at 534. For example, a proxy may be associated with two permissible rows (e.g., the first row and the second row) where the first iteration iterates through the combinations of the first row and its permissible orientations, the second row may be identified at 534. The actions from 506 through 516 and 520 to 534 may then be repeated until all the first permissible characteristics have been analyzed. On the other hand, if it is determined at 532 that all the first permissible characteristics have been accommodated in the group legality check, the process may end at 536 to conclude that no legal placement solution exists for the group.

In some embodiments where no legal placement solutions can be identified after iterating through all the combinations of the first and second permissible characteristics for the proxy, non-compliance resolution as previously described with reference to 318 through 328 may be optionally performed.

Figure 6A:
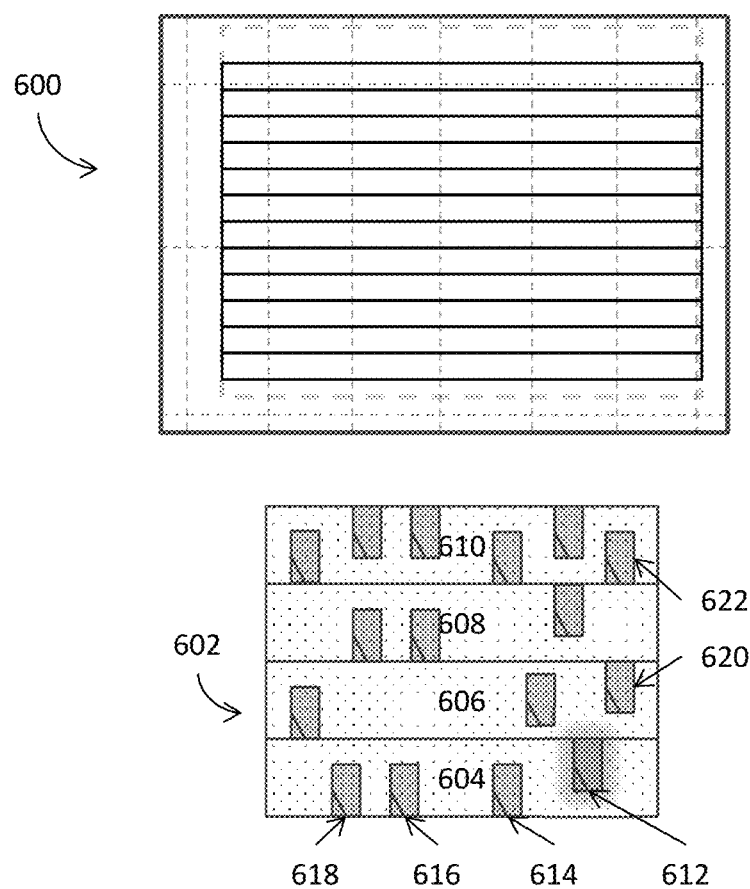

FIGS. 6A-6H illustrate some examples of the application of some techniques described herein to a simplified example of a placement layout or floorplan in some embodiments. More specifically, FIG. 6A illustrates a group 602 that is to be placed into a row region 600. The group includes a plurality of instances (612, 614, 616, 618, 620, 622, etc.) located in four rows 604, 606, 608, and 610. Instance 612 is identified as the proxy for the group 602. It shall be noted that 602 also represents the R0 (rotation by 0 degrees) configuration for the group.

FIG. 6B illustrates an example of a data structure 600B storing permissible characteristics for instances. The data structure includes the instance identifier and the group identifier for each instance, one or more permissible rows for each instance, and one or more permissible orientations for each permissible row. It shall be noted that the example data structure includes the permissible rows and the permissible orientations strictly as an example, and that other permissible characteristics may also be included. For example, the data structure indicates that instance 612 may be inserted into Row0 and Row1.

When instance 612 is inserted into Row0, instance 612 is to be oriented in R0 or MX orientation to produce a legal placement result. When instance 612 is inserted into Row1, instance 612 is to be oriented in R180 or MY orientation to produce a legal placement result. As another example, the data structure indicates that instance 620 may be inserted into Row2 and Row5. When instance 620 is inserted into Row2, instance 620 is to be oriented in R90, MX, or MY orientation to produce a legal placement result. When instance 620 is inserted into Row5, instance 620 is to be oriented in R270 or MX orientation to produce a legal placement result.

The data structure illustrated in FIG. 6B is presented strictly as an example. Nonetheless, such data structures are used to configure the memory of one or more computing systems by storing the data there in specific locations in the memory to facilitate the placement or floorplanning of an electronic design. In some embodiments, the data structure may be used to configure the memory accessible by placement modules such that the placement modules may function in tandem with one or more other modules (e.g., a group legality module) to efficiently determine whether a group of instances is placed in a row region in a group legal manner, without accessing individual instances within the group.

This advantage effectively eliminates checking in and checking out individual instances from the layout database and thus effectively reduces the consumption of computational resources in terms of memory footprint, processor cycles, as well as network inputs and outputs. Moreover, the data structure may be further used to reference unique identifiers (e.g., instance identifiers or the group identifier—instance identifier pairs) as indices for the data structure to efficiently access the data contained therein as well as to efficiently access other data stored linked to these unique identifiers outside of the data structure (e.g., connectivity information in the schematic database, physical connectivity in the layout database, etc.)

Figure 6C:
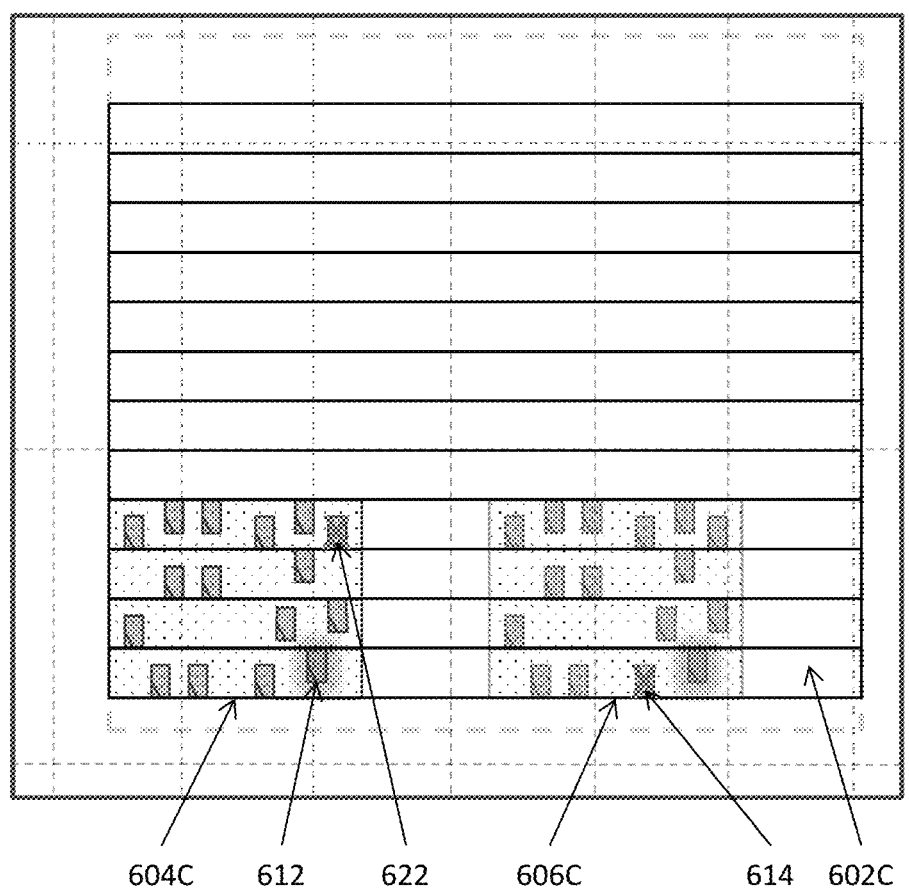

FIG. 6C illustrates the example of placing the proxy 612 according to the permissible row0 (602C) and permissible orientation of R0 according to the data structure illustrated in FIG. 6B. The remaining instances in the group may be placed by leveraging their relative positions to the proxy 612, without considering their respective placement requirements, rules, or constraints as described above. FIG. 6C illustrates that a placement engine may place the left end of the group against the left boundary of the row region as shown in 604C or place the group at another legal location 606C, if available. Once the entire group is placed according to the placement for the proxy, group legality may be checked. FIG. 6C further illustrates that instance 622 fails the group legality check when the group is placed at a location illustrated by 604C, and that instance 614 fails the group legality check when the group is placed at a location illustrated by 606C.

Figure 6D:
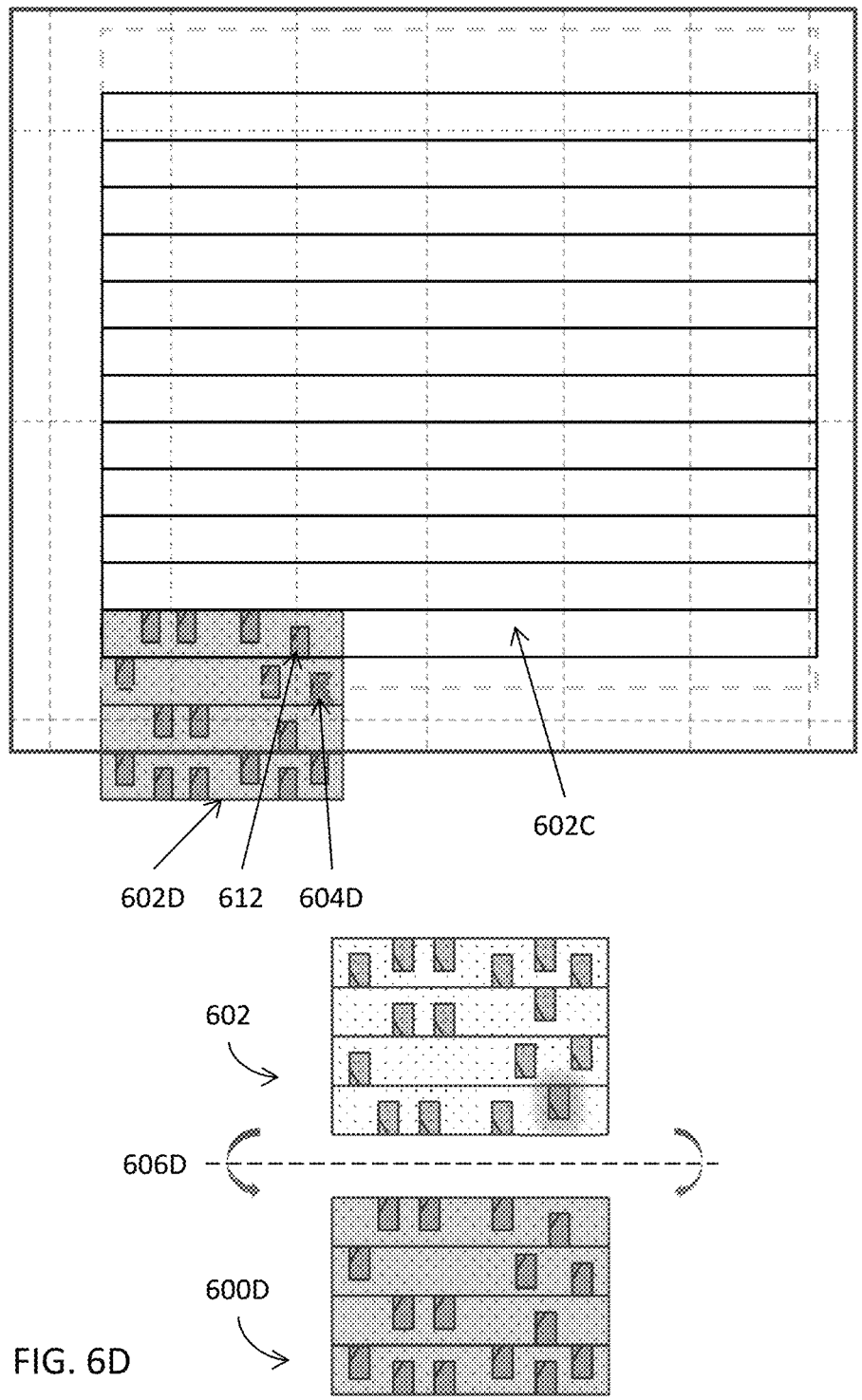

FIG. 6D illustrates placing the proxy 612 in a permissible row( )(602C) with the permissible orientation MX. That is, the proxy 612 and hence the group are mirrored against the X-axis, and the mirrored proxy is then placed in the permissible row( )(602C). The mirroring of the proxy 612 against the X-axis (606D) effectively transforms the group 602 into the mirrored group 600D as illustrated in FIG. 6D. With the placement of the proxy in row( )(602C), the group is placed with respect to the row region as illustrated by 602D. Some embodiments perform the group legality check and identify instance 604D as row non-compliant because instance 604D fails to belong to any row. The group legality check may terminate without further examining the other instances that are also row non-compliant because the non-compliance of instance 604D renders the entire group non-compliant.

Figure 6E:
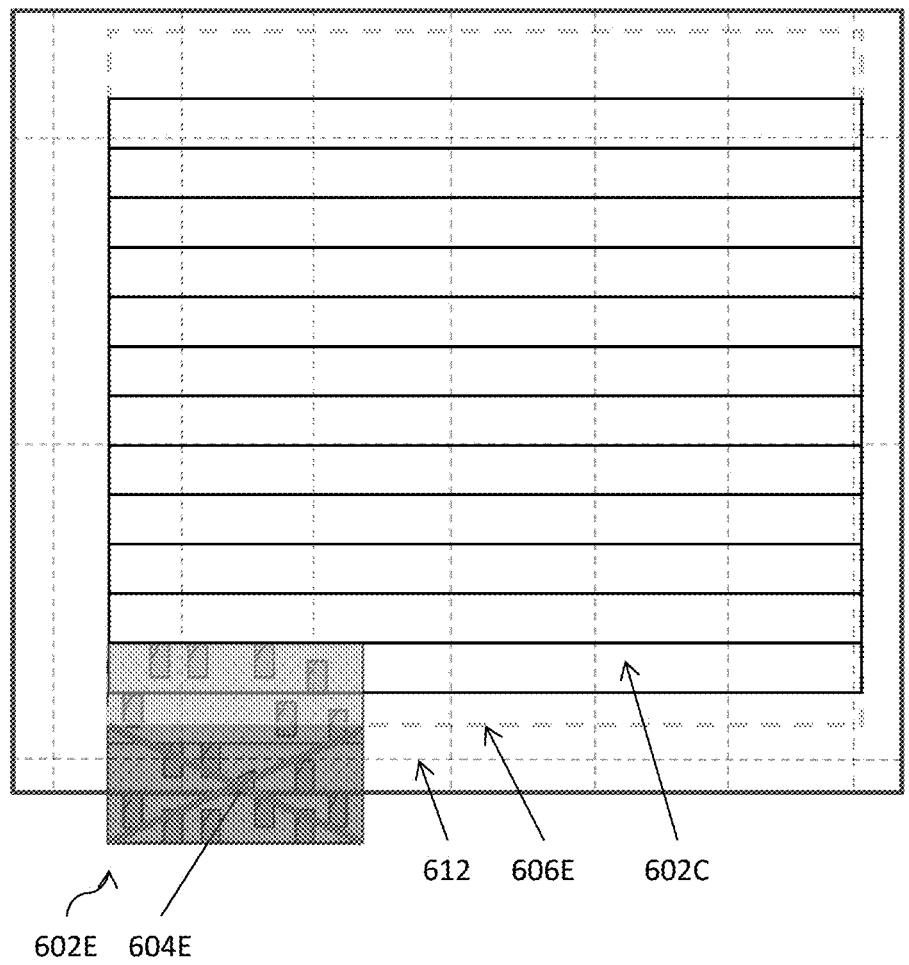

In some embodiments, a pre-filter legality check may be performed by determining whether the row region is sufficiently large to encompass the bounding box of the mirrored group. As FIG. 6E shows, the row region 606E fails to accommodate the portion 604E of the bounding box 602E of the group. As a result, the group cannot be legally placed in the row region, and the group legality check is not needed to conserve computational resources. The mirrored instance 612 is placed in Row0 (602C) in both FIG. 6D and FIG. 6E. In FIG. 6D, group legality check is performed on one or more remaining instances after placing the proxy according to its permissible row and permissible orientation until a non-compliance or violation is identified. In contrast, the group legality check is not performed for FIG. 6E. Rather, a pre-filter legality check by simply comparing the extent of the row region 606E with the bounding box 602E of the group.

Figure 6F:
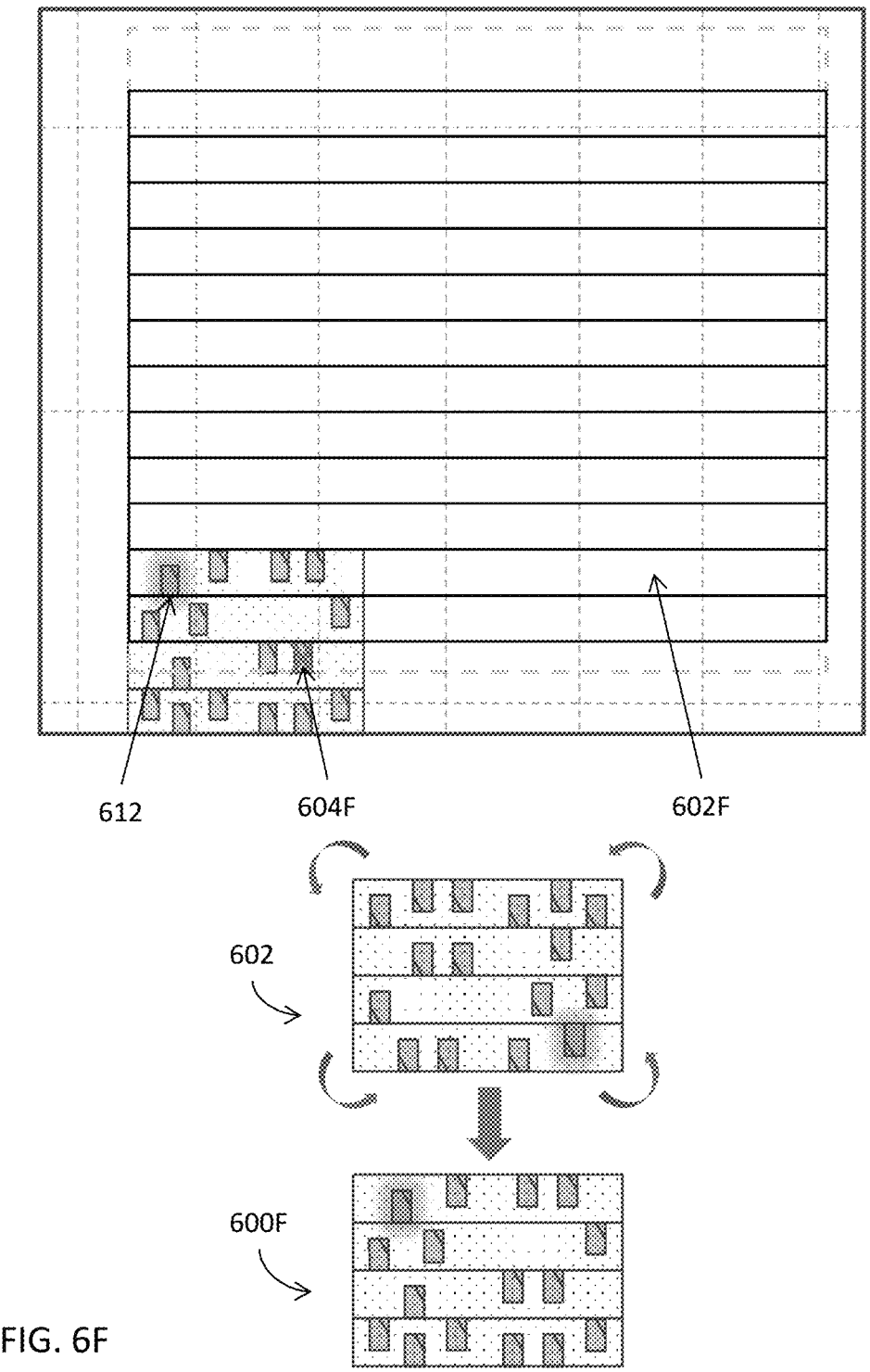
Figure 6G:
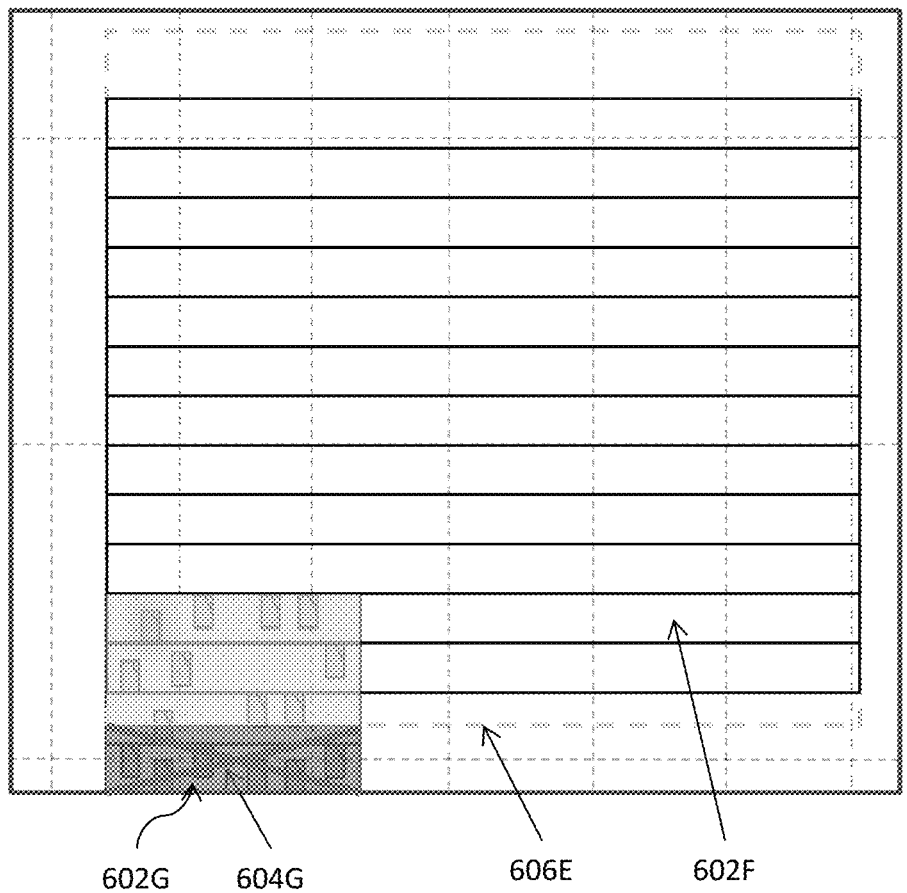

FIG. 6F illustrates placing the proxy 612 in Row1 (602F) in a permissible orientation (R180). In this example, proxy 612 and hence the group is rotated by 180 degrees, and the rotated proxy 612 is placed in Row1 (602F). Rotating the proxy 612 by 180 degrees effectively transforms the group 602 into the rotated group 600F as illustrated in FIG. 6F. In FIG. 6F, group legality check is performed on one or more remaining instances after placing the proxy 612 according to its permissible row and permissible orientation until a non-compliance or violation is identified (instance 604F). FIG. 6G shows, the row region 606E fails to accommodate the portion 604G of the bounding box 602G of the rotated group (rotated by 180 degrees). As a result, the rotated group cannot be legally placed in the row region 606E, and the group legality check may thus be skipped to conserve computational resources.

Figure 6H:
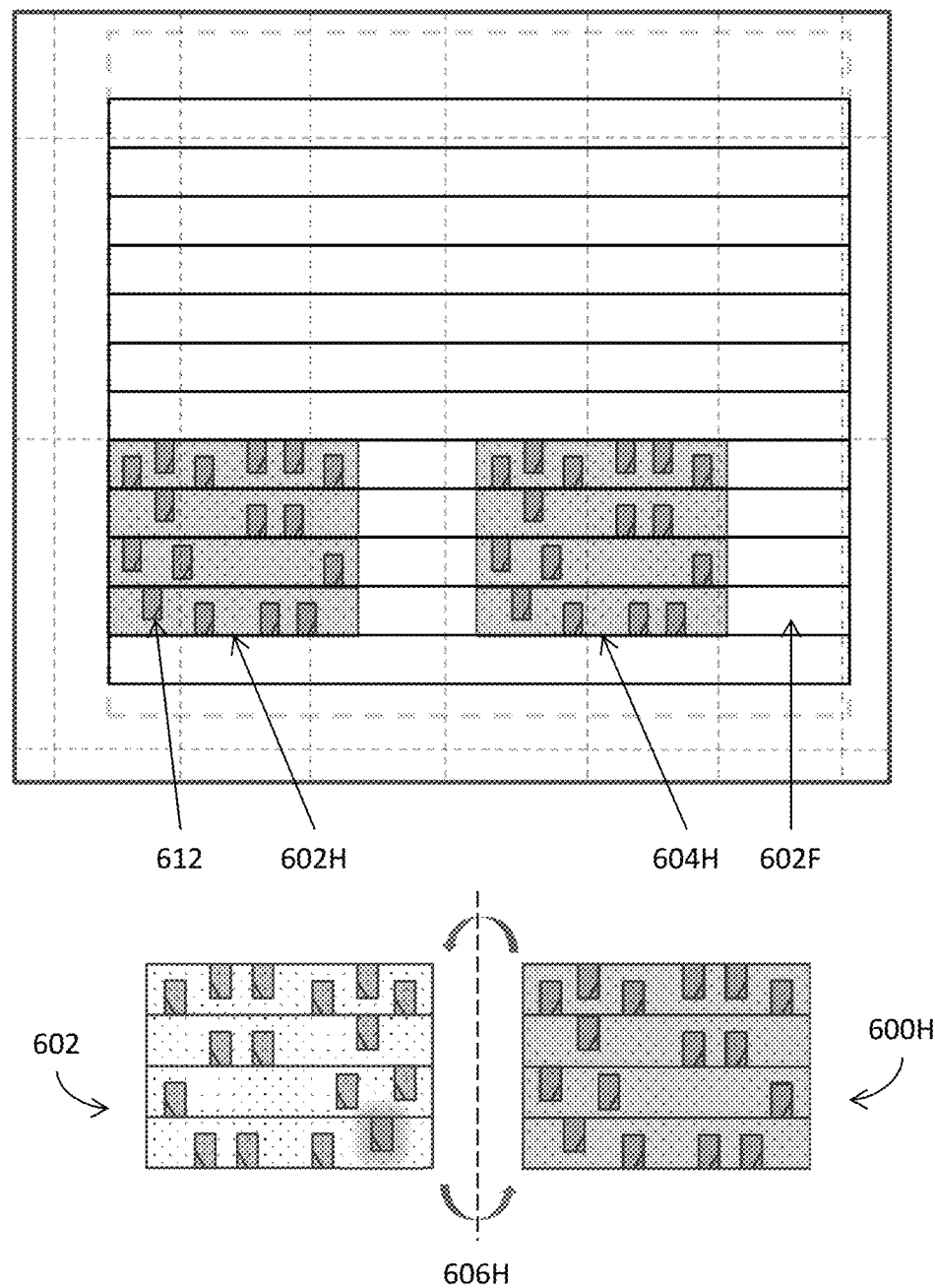

FIG. 6H illustrates placing the proxy 612 in the permissible row1 in the permissible orientation MY (mirroring against the Y-axis). The mirrored proxy 612 is placed in the row1 (602F), and the remaining instances of the mirrored group may thus be inserted into their respective locations using their relative locations to the mirrored proxy 612. The mirroring of the proxy 612 against the Y-axis (606H) effectively transforms the group 602 into the mirrored group 600H as illustrated in FIG. 6H. FIG. 6H illustrates two candidate legal placement options 602H and 604H for the group.

Figure 7A:
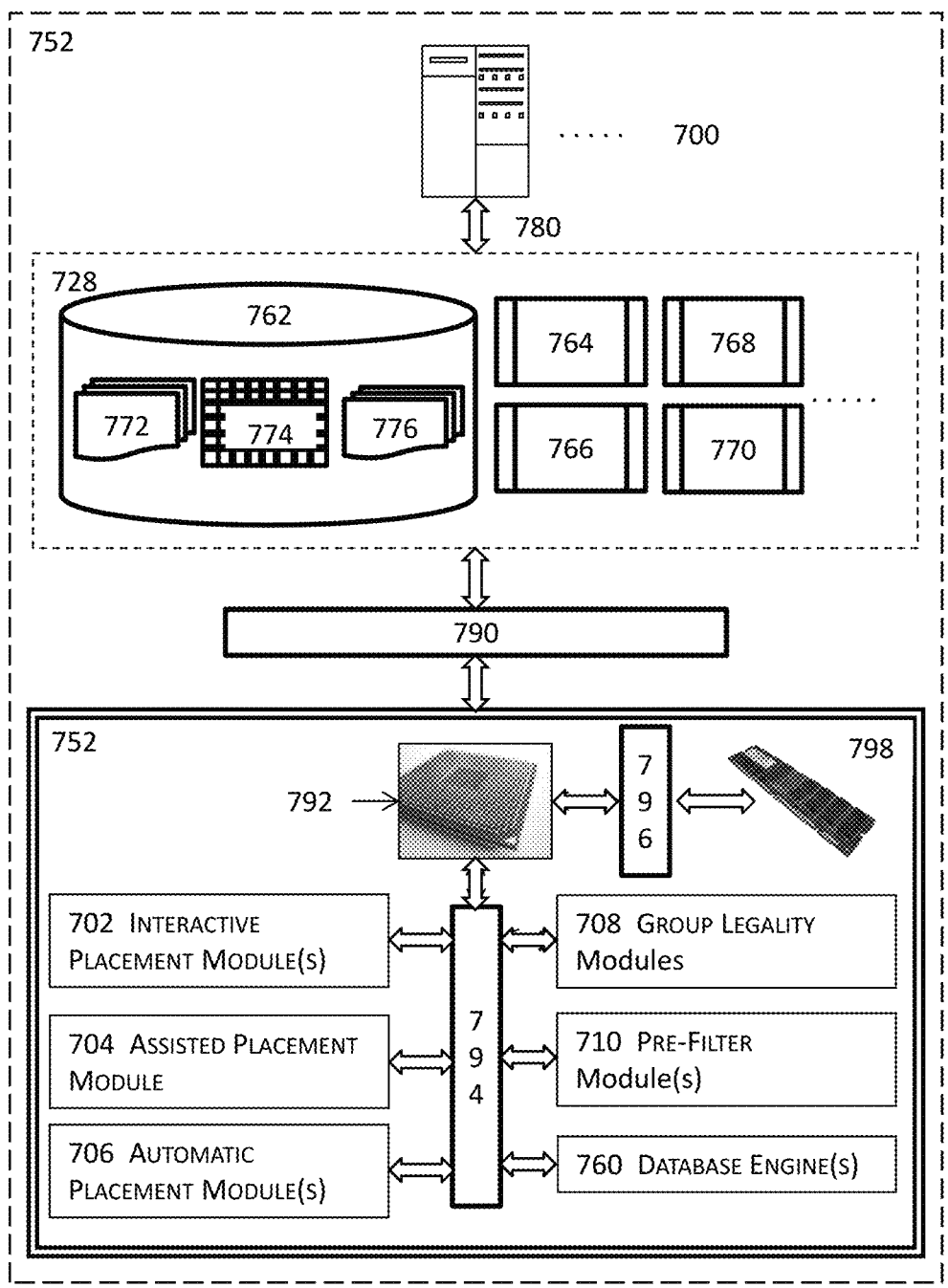
FIG. 7A illustrates a block diagram of a system for implementing group legal placement on rows and grids for an electronic design in one or more embodiments.

FIG. 7A illustrates a block diagram of a system for implementing placement using row templates for an electronic design using row templates in one or more embodiments. More specifically, FIG. 7A illustrates an illustrative high level schematic block diagrams for a system for implementing placement using row templates for an electronic design using row templates and may comprise one or more computing systems 700, such as a general purpose computer described in the System Architecture Overview section configured to perform unique functions described herein to achieve one or more special, intended proposes. The illustrative system in FIG. 7A may include an Internet-based computing platform providing a shared pool of configurable computer processing resources (e.g., computer networks, servers, storage, applications, services, etc.) and data to other computers and devices in an ubiquitous, on-demand basis via the Internet. For example, one or more computing resources and/or modules illustrated in FIG. 7A may be located in a cloud computing platform in some embodiments.

In some embodiments, the one or more computing systems 700 may invoke various system resources such as the processor(s) or processor core(s), memory, disks, etc. The one or more computing systems 700 may also initiate or interact with other computing systems to access, via a computer bus architecture (e.g., a system bus, a control bus, a data bus, or any combinations thereof), various resources 728 that may comprise a floorplanner, a global routing engine, and/or a detail routing engine 764, a layout editor 766, a design rule checker 768, a verification engine 770, etc.

The one or more computing systems 700 may further write to and read from a local or remote non-transitory computer accessible storage 762 that stores thereupon data or information such as, but not limited to, one or more databases (774) such as schematic design database(s) or physical design database(s), electronic circuit design specification database(s), various statistics, various data, rule decks, various design rules, constraints, etc. (772), or other information or data (776) that may be used to facilitate the performance of various functions to achieve the intended purposes.

In some embodiments, the one or more computing systems 700 may include or, either directly or indirectly through the various resources 728, invoke a set of modules 752 including hardware modules and software modules or combinations of one or more hardware modules and one or more software modules that may comprise one or more interactive placement modules 702 that interact with a designer in implementing a placement layout or floorplan. For example, a designer may manually define a region and manually drag an instance to a desired location in the manually defined region in a placement layout or floorplan, and an interactive placement module 702 may determine one or more legal positions in one or more rows in a row region based on where the design drags the instance in order to insert the instance to create a legal placement layout or floorplan.

The set of modules 752 may also include one or more assisted placement modules 704 that assist a designer in placing one or more instances in a placement layout or floorplan. For example, a designer may specify a set of instances to be placed in a region in a placement layout or floorplan. An assisted placement module 704 may identify this set of instances and their respective characteristics, identify one or more row templates, apply the one or more row templates to the region, and determine one or more viable placement options for the set of instances. The set of modules 752 may also include an automatic placement module 706 that automatically place the devices of an electronic design or a portion thereof by automatically determining one or more row regions, identifying one or more row templates, applying the one or more row templates to the one or more row regions, and placing the devices or a portion thereof into corresponding rows in the one or more row regions by using the one or more row templates, without human intervention.

The set of modules 752 may also include one or more group legality modules 708 that performing various checks to determine whether a group of instances is placed at a legal location in a placement layout or a floorplan. The set of modules 752 may also include one or more pre-filter modules 710 that perform various pre-filter tasks on an electronic design or a portion thereof to reduce the size of the search space in order to reduce the consumption of computational resources. These checks performed by the one or more group legality modules 708 and pre-checks performed by the one or more pre-filter modules 708 are described above with reference to FIGS. 2-5C as well as the examples in FIGS. 5A-5C. In addition or in the alternative, this set of modules 752 may include one or more database engines 760 that function in tandem with one or more other modules (e.g., a row template module, a row module, one or more placement modules, etc.) to perform various database operations such as database queries, etc.

In some embodiments, the computing system 700 may include the various resources 728 such that these various resources may be invoked from within the computing system via a computer bus 780 (e.g., a data bus interfacing a microprocessor 792 and the non-transitory computer accessible storage medium 798 or a system bus 790 between a microprocessor 792 and one or more engines in the various resources 728). In some other embodiments, some or all of these various resources may be located remotely from the computing system 700 such that the computing system may access the some or all of these resources via a computer bus 780 and one or more network components.

The computing system may also include one or more modules in the set of modules 752. One or more modules in the set 752 may include or at least function in tandem with a microprocessor 792 via a computer bus 794 in some embodiments. In these embodiments, a single microprocessor 792 may be included in and thus shared among more than one module even when the computing system 700 includes only one microprocessor 792. A microprocessor 792 may further access some non-transitory memory 798 (e.g., random access memory or RAM) via a system bus 796 to read and/or write data during the microprocessor's execution of processes.

The present disclosure is directed to generating a legal placement layout for a group of instances without separately processing (e.g., placement) individual device instances in the group. A group includes a plurality of cell or device instances whose relative positioning in the group remains fixed and may be nested without another group. A group may thus be treated and stored as a hierarchical structure having a plurality of hierarchies (e.g., a hierarchy representing the group and at least one hierarchies representing the instances within the group). To generate a legal placement for a group, a plurality of instances in the group may be first identified. Each instance may include one or more legal rows. A proxy and its one or more legal rows may be selected from the plurality of instances in the group.

These techniques may identify a row region and identify one or more legal rows into which the proxy may be placed in a row region to result in a legal placement for the proxy. These one or more legal rows may include the attributes and/or properties (e.g., component types, orientations, spacing values, etc.) that may legally accommodate the proxy of the group. The placement engine may loop through one or more legal rows for the proxy. For each legal row, the legal row legally accommodates the proxy because these one or more legal rows are first identified with respect to the proxy.

The placement engine then examines one or more neighboring rows in the row region and loop through one or more remaining instances in the group to determine which legal row of the one or more legal rows produces a legal placement for these one or more remaining instances. In some embodiments where no legal placement is possible for the one or more remaining instances, this group of instances may be flagged for further review. In some of these embodiments, a new row region may be created anew or carved out from the existing row region, and a new row template customarily configured to accommodate this group may be generated so that a legal placement layout may be generated while accommodating this group.

In some other embodiments where two or more legal rows are identified to accommodate the proxy and produce a legal placement of the group, these two or more legal rows or the corresponding placement options for the group may be stored, and the final placement of the group may be determined based on one or more additional factors such as metal density, area utilization, cost for placement and/or subsequent routing, etc.

Strictly as an example involving placement of a group of instances into row region in a layout canvas, a proxy of a group of cell or device instances and one or more legal rows for the proxy may be identified. The layout canvas may be assumed to have one or more row regions each including a plurality of rows defined by one or more row templates. A placement engine may loop through these one or more row regions. For a given row region, the placement engine may loop through the proxy's legal rows. For each legal row for the proxy, the placement engine may further loop through the orientations for the proxy and examine a plurality of instances within every legal orientation of the legal row of the proxy.

The proxy may be positioned or repositioned by checking the legality of the remaining one or more instances. In some embodiments, the entire group may be positioned or repositioned relative to the positioning or the repositioning of the proxy in a group aware manner to ensure that the proxy is in a legal position, and that the one or more remaining instances are in attestable state. A bounding box check may be performed to determine whether the positioned or repositioned group of instances as represented by the bounding box fits in the set of rows identified by the placement engine. After the group of instances is positioned, the placement engine may further examine the legality of the one or more remaining instances (other than the proxy) in the group. If it is determined that the one or more remaining instances in the group are placed in their respective legal positions the placement for the group of cell or device instances is complete. Otherwise, the position is marked or flagged as illegal for further review or processing.

System Architecture Overview

Figure 7B:
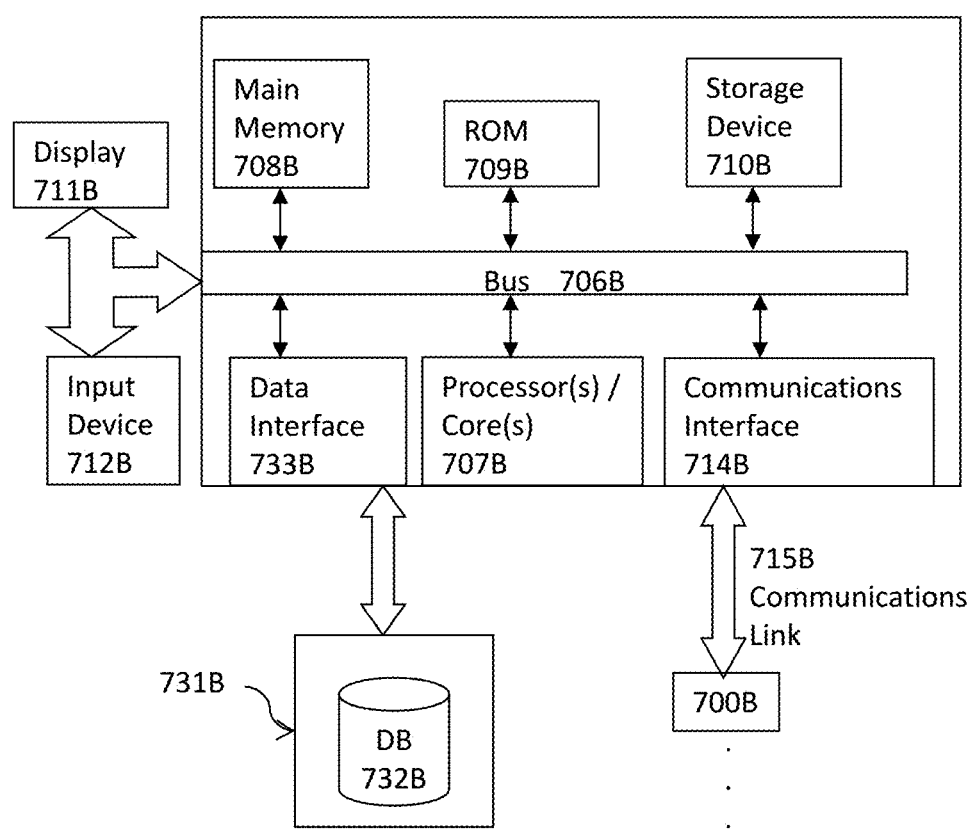
FIG. 7B illustrates a computerized system on which a method for implementing group legal placement on rows and grids for an electronic design may be implemented.

FIG. 7B illustrates a computerized system on which a method for implementing group legal placement on rows and grids for an electronic design may be implemented. as described in the preceding paragraphs with reference to various figures. The illustrative computing system 700B may include an Internet-based computing platform providing a shared pool of configurable computer processing resources (e.g., computer networks, servers, storage, applications, services, etc.) and data to other computers and devices in an ubiquitous, on-demand basis via the Internet. For example, the computing system 700B may include or may be a part of a cloud computing platform in some embodiments. Computer system 700B includes a bus 706B or other communication module for communicating information, which interconnects subsystems and devices, such as processor 707B, system memory 708B (e.g., RAM), static storage device 709B (e.g., ROM), disk drive 710B (e.g., magnetic or optical), communication interface 714B (e.g., modem or Ethernet card), display 711B (e.g., CRT or LCD), input device 712B (e.g., keyboard), and cursor control (not shown).

According to one embodiment, computing system 700B performs specific operations by one or more processor or processor cores 707B executing one or more sequences of one or more instructions contained in system memory 708B. Such instructions may be read into system memory 708B from another computer readable/usable storage medium, such as static storage device 709B or disk drive 710B. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

Various actions or processes as described in the preceding paragraphs may be performed by using one or more processors, one or more processor cores, or combination thereof 707B, where the one or more processors, one or more processor cores, or combination thereof executes one or more threads. For example, various acts of identifying, various acts of determining, various acts of classifying, various acts of implementing, various acts of performing, various acts of transforming, various acts of decomposing, various acts of updating, various acts of presenting, various acts of modifying, etc. may be performed by one or more processors, one or more processor cores, or combination thereof.

A modules described herein may also be implemented as a pure hardware module (e.g., a block of electronic circuit components, electrical circuitry, etc.) or a combination of a hardware module and a software block that jointly perform various tasks to achieve various functions or purposes described herein or equivalents thereof. For example, a module described herein may be implemented as an application-specific integrated circuit (ASIC) in some embodiments.

In these embodiments, a module may thus include, for example, a microprocessor or a processor core and other supportive electrical circuitry to perform specific functions which may be coded as software or hard coded as a part of an application-specific integrated circuit, ROM (read only memory), PROM (programmable read only memory), EPROM (erasable programmable read only memory), etc. despite the fact that these microprocessor, processor core, and electrical circuitry may nevertheless be shared among a plurality of module. A module described herein or an equivalent thereof may perform its respective functions alone or in conjunction with one or more other modules. A module described herein or an equivalent thereof may thus invoke one or more other modules by, for example, issuing one or more commands or function calls. The invocation of one or more other modules may be fully automated or may involve one or more user inputs.

The term "computer readable storage medium" or "computer usable storage medium" as used herein refers to any non-transitory medium that participates in providing instructions to processor 707B for execution. Such a medium may take many forms, including but not limited to, non-volatile media and volatile media. Non-volatile media includes, for example, optical or magnetic disks, such as disk drive 710B. Volatile media includes dynamic memory, such as system memory 708B. Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), magnetic tape, any other magnetic or magneto-optical medium, CD-ROM, any other optical medium, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 700B. According to other embodiments of the invention, two or more computer systems 700B coupled by communication link 715B (e.g., LAN, PTSN, or wireless network) may perform the sequence of instructions required to practice the invention in coordination with one another.

Computer system 700B may transmit and receive messages, data, and instructions, including program, i.e., application code, through communication link 715B and communication interface 714B. Received program code may be executed by processor 707B as it is received, and/or stored in disk drive 710B, or other non-volatile storage for later execution. In an embodiment, the computing system 700B operates in conjunction with a data storage system 731B, e.g., a data storage system 731B that includes a database 732B that is readily accessible by the computing system 700B. The computing system 700B communicates with the data storage system 731B through a data interface 733B. A data interface 733B, which is coupled with the bus 706B, transmits and receives electrical, electromagnetic or optical signals that include data streams representing various types of signal information, e.g., instructions, messages and data. In embodiments of the invention, the functions of the data interface 733B may be performed by the communication interface 714B.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

We claim:

1. A computer implemented method for implementing group legal placement on rows and grids for an electronic design, comprising:

identifying a row region from a data structure, wherein the row region or its reference is stored as an object in a data structure and includes information about bounds of a region in a layout;

identifying, at one or more group legal modules stored at least partially in memory and functioning in tandem with one or more microprocessors of at least one computing system, a proxy from a group of instances of a plurality of groups of instances;

placing the group into a row region based in part or in whole upon a plurality of permissible characteristics for the proxy and a plurality of corresponding characteristics pertaining to the row region; and updating or generating, at the one or more group legal modules, a group legal layout including the group of instances at least by determining whether the layout including the group in the row region is group legal with at least the data structure that configures the memory of the at least one computing system to facilitate checking legality requirements associated with the proxy, while skipping the legality requirements associated with one or more remaining instances in the group of instances.

2. The computer implemented method of claim 1, further comprising:

performing a multi-stage filtering on the electronic design, a performance of the multi-stage filtering comprising:

pre-filtering a search space into a first reduced space at least by discarding one or more rows in the electronic design based at least in part upon one or more row characteristics for the one or more rows and one or more corresponding characteristics in the data structure; and reducing the first filtered space search space for placing the group of instances in the electronic design into a second reduced search space at least by trimming the first reduced search space with a size or orientation pertaining to the group of instances with respect to a plurality of row regions in the electronic design;

exploring the second reduced search space and identifying the row region in the reduced search space; and resolving one or more non-compliant instances in the plurality of instances in the group.

3. The computer implemented method of claim 2, further comprising:

determining whether the group is a hard group or a soft group, wherein the hard group is not amenable to modifications within the hard group, and the soft group is amenable to the modifications within the soft group.

4. The computer implemented method of claim 3, further comprising:

modifying the group when the group is determined to be a soft group; and flagging the group for further review when the group is determined to be a hard group.

5. The computer implemented method of claim 3, further comprising:

modifying the row region based in part or in whole upon the one or more non-compliant instances in the plurality of instances; or relaxing one or more row region characteristics of the row region or one or more permissible characteristics pertaining to non-compliance of the non-compliant instances.

6. The computer implemented method of claim 1, further comprising:

reducing a search space by applying one or more pre-filtering techniques.

7. The computer implemented method of claim 6, further comprising:

determining a rectilinear bounding box encompassing the group;

identifying an extent of the row region; and determining whether the extent of the row region accommodate the rectilinear bounding box of the group based in part or in whole upon the plurality of permissible characteristics of the proxy.

8. The computer implemented method of claim 6, further comprising:

identifying one or more group rows in the group and respective permissible characteristics for the one or more group rows;

identifying one or more row region rows created in the row region and corresponding row characteristics for the one or more row region rows obtained by applying at least one row template to the row region; and determining group legality of the group at least by comparing the respective permissible characteristics to the corresponding row characteristics.

9. The computer implemented method of claim 1, determining whether the layout is group legal further comprising:

identifying a first remaining instance of one or more remaining instances other than the proxy in the group from the row region;

identifying a first plurality of permissible characteristics for the first remaining instance; and performing a group legality check at least by determining whether placement of the first remaining instance in the row region satisfies the first plurality of permissible characteristics.

10. The computer implemented method of claim 9, determining whether the layout is group legal further comprising:

determining whether there exist one or more other remaining instances whose legality in the row region has not been determined when the first remaining instance is determined to be legal;

identifying the one or more other remaining instances when it is determining that there exist the one or more remaining whose legality in the row region has not been determined;

performing the group legality check for the one or more other remaining instances; and generating a first legal placement option for placing the group in the row region when the one or more remaining instances satisfy their respective pluralities of permissible characteristics.

11. The computer implemented method of claim 10, determining whether the layout is group legal further comprising:

determining whether the group legality check is to be terminated when the first remaining instance is determined to be legal;

identifying one or more different combinations of the plurality of permissible characteristics for the proxy when the group legality check is determined not to be terminated; and placing the group into the row region according to a different combination of the one or more different combinations for the proxy, without considering permissible characteristics of the one or more remaining instances other than the proxy in the group.

12. The computer implemented method of claim 10, determining whether the layout is group legal further comprising:

determining whether the layout is group legal at least by performing the group legality check on the one or more remaining instances;

determining zero or more legal placement options for placing the group in the row region;

identifying a final legal placement option for placing the group in the row region from the first legal placement option and the zero or more legal placement options; and storing the first legal placement option and the zero or more legal placement options in a data structure.

13. A system for implementing group legal placement on rows and grids for an electronic design, comprising:

a plurality of modules, at least one of which comprises at least one microprocessor including one or more processor cores executing one or more threads in a computing system;

a non-transitory computer accessible storage medium storing thereupon program code that includes a sequence of instructions that, when executed by the at least one microprocessor or processor core of at least one computing system, causes the at least one microprocessor or processor core at least to:

identify a row region from a data structure, wherein the row region or its reference is stored as an object in a data structure and includes information about bounds of a region in a layout;

identify, at one or more group legal modules stored at least partially in memory and functioning in tandem with the at least one microprocessors or processor core of the at least one computing system, a proxy from a group of instances of a plurality of groups of instances;

place the group into a row region based in part or in whole upon a plurality of permissible characteristics of the proxy and a plurality of corresponding characteristics pertaining to the row region; and update or generate a group legal layout including the group of instances at least by executing the sequence of instructions that causes the at least one microprocessor or processor core to determine whether the layout including the group in the row region is group legal with at least the data structure that configures the memory of the at least one computing system to facilitate checking legality requirements associated with the proxy, while skipping the legality requirements associated with one or more remaining instances in the group of instances.

14. The system of claim 13, wherein the program code includes further instructions that, when executed by the at least one micro-processor or processor core, cause the at least one processor or processor core to:

resolve one or more non-compliant instances in the plurality of instances in the group; and determine whether the group is a hard group or a soft group, wherein the hard group is not amenable to modifications within the hard group, and the soft group is amenable to the modifications within the soft group.

15. The system of claim 14, wherein the program code includes further instructions that, when executed by the at least one micro-processor or processor core, cause the at least one processor or processor core to:

modify the group when the group is determined to be a soft group; and flag the group for further review when the group is determined to be a hard group.

16. The system of claim 14, wherein the program code includes further instructions that, when executed by the at least one micro-processor or processor core, cause the at least one processor or processor core to:

modify the row region based in part or in whole upon the one or more non-compliant instances in the plurality of instances; or relax one or more row region characteristics of the row region or one or more permissible characteristics pertaining to non-compliance of the non-compliant instances.

17. An article of manufacture comprising a non-transitory computer accessible storage medium having stored thereupon a sequence of instructions which, when executed by at least one processor or at least one processor core executing one or more threads, causes the at least one processor or the at least one processor core to perform a set of acts for implementing group legal placement on rows and grids for an electronic design, the set of acts comprising:

identifying a row region from a data structure, wherein the row region or its reference is stored as an object in a data structure and includes information about bounds of a region in a layout;

identifying, at one or more group legal modules stored at least partially in memory and functioning in tandem with one or more microprocessors of at least one computing system, a proxy from a group of instances of a plurality of groups of instances;

placing the group into a row region based in part or in whole upon a plurality of permissible characteristics of the proxy and a plurality of corresponding characteristics pertaining to the row region; and updating or generating a group legal layout including the group of instances at least by determining whether the layout including the group in the row region is group legal with at least the data structure that configures the memory of the at least one computing system to facilitate checking legality requirements associated with the proxy, while skipping the legality requirements associated with one or more remaining instances in the group of instances.

18. The article of manufacture of claim 17, the set of acts further comprising:

reducing a search space by applying one or more pre-filtering techniques;

determining a rectilinear bounding box encompassing the group;

identifying an extent of the row region; and determining whether the extent of the row region accommodate the rectilinear bounding box of the group based in part or in whole upon the plurality of permissible characteristics of the proxy.

19. The article of manufacture of claim 18, the set of acts further comprising:

identifying one or more group rows in the group and respective permissible characteristics for the one or more rows;

identifying one or more row region rows created in the row region and corresponding row characteristics for the one or more row region rows obtained by applying at least one row template to the row region; and determining group legality of the group at least by comparing the respective permissible characteristics to the corresponding row characteristics.

20. The article of manufacture of claim 17, the set of acts further comprising:

identifying a first remaining instance of one or more remaining instances other than the proxy in the group from the row region;

identifying a first plurality of permissible characteristics for the first remaining instance;

performing a legality check at least by determining whether placement of the first remaining instance in the row region satisfies the first plurality of permissible characteristics;

determining whether there exist one or more other remaining instances whose legality in the row region has not been determined when the first remaining instance is determined to be legal;

identifying the one or more other remaining instances when it is determining that there exist the one or more remaining whose legality in the row region has not been determined;

performing the legality check for the one or more other remaining instances; and generating a first legal placement option for placing the group in the row region when the one or more remaining instances satisfy their respective pluralities of permissible characteristics.

* * * * *